(12) United States Patent
Carmen

(10) Patent No.: US 9,035,634 B2
(45) Date of Patent: *May 19, 2015

(54) POWER SUPPLY FOR A LOAD CONTROL DEVICE

(75) Inventor: Daniel F. Carmen, Schnecksville, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 340 days.

This patent is subject to a terminal disclaimer.

(21) Appl. No.: 13/279,454

(22) Filed: Oct. 24, 2011

(65) Prior Publication Data

US 2012/0032649 A1  Feb. 9, 2012

Related U.S. Application Data

(63) Continuation of application No. 12/328,906, filed on Dec. 5, 2008, now Pat. No. 8,067,926.

(60) Provisional application No. 61/015,965, filed on Dec. 21, 2007.

(51) Int. Cl.

| | |
|---|---|
| *G01F 1/00* | (2006.01) |
| *H05B 37/02* | (2006.01) |
| *H02M 5/257* | (2006.01) |
| *H05B 39/04* | (2006.01) |
| *H02M 1/00* | (2006.01) |

(52) U.S. Cl.
CPC ........... *H05B 37/0263* (2013.01); *H02M 5/257* (2013.01); *H02M 2001/0006* (2013.01); *H05B 39/044* (2013.01)

(58) Field of Classification Search
USPC ........................................................ 323/282
See application file for complete search history.

(56) References Cited

U.S. PATENT DOCUMENTS 3,990,000 A * 11/1976 Digneffe ................... 323/322
4,270,058 A *  5/1981 Schornack ................. 307/140

(Continued)

FOREIGN PATENT DOCUMENTS

EP      0 622 889 A    11/1994

OTHER PUBLICATIONS

European Patent Office, International Search Report and Written Opinion for International Patent Application No. PCT/US2008/013726, Jul. 31, 2009, 17 pages.

*Primary Examiner* — Benjamin M Baldridge
(74) *Attorney, Agent, or Firm* — Mark E. Rose; Philip N. Smith

(57) ABSTRACT

A power supply for a load control device generates a DC voltage and provides an asymmetrical output current, while drawing a substantially symmetrical input current. The power supply comprises a controllably conductive switching circuit for controllably charging an energy storage capacitor across which the DC voltage is produced. The energy storage capacitor begins charging at the beginning of a half-cycle and stops charging after a charging time in response to the magnitude of the DC voltage and the amount of time that the energy storage capacitor has been charging during the present half-cycle. The charging time is maintained substantially constant from one half-cycle to the next. The power supply is particularly beneficial for preventing asymmetrical current from flowing in a multiple location load control system having a master load control device supplying power to a plurality of remote load control devices all located on either the line-side or the load-side of the system.

20 Claims, 15 Drawing Sheets

(56) References Cited

U.S. PATENT DOCUMENTS

| | | | |
|---|---|---|---|
| 4,359,681 A * | 11/1982 | Baker et al. | 323/320 |
| 4,439,688 A | 3/1984 | Schornack | |
| 4,563,592 A | 1/1986 | Yuhasz et al. | |
| 4,689,547 A | 8/1987 | Rowen et al. | |
| 4,745,351 A | 5/1988 | Rowen et al. | |
| 4,816,982 A | 3/1989 | Severinsky | |
| 5,017,837 A | 5/1991 | Hanna et al. | |
| 5,248,919 A | 9/1993 | Hanna et al. | |
| 5,798,581 A | 8/1998 | Keagy et al. | |
| 6,160,389 A * | 12/2000 | Watts | 323/282 |
| 6,172,883 B1 | 1/2001 | Kates et al. | |
| 6,674,248 B2 | 1/2004 | Newman, Jr. et al. | |
| 6,969,959 B2 * | 11/2005 | Black et al. | 315/307 |
| 6,980,122 B2 | 12/2005 | Novikov | |
| 6,987,449 B2 | 1/2006 | Novikov | |
| 7,005,762 B2 | 2/2006 | Black et al. | |
| 7,005,835 B2 | 2/2006 | Brooks et al. | |
| 7,012,518 B2 | 3/2006 | Novikov | |
| 7,091,672 B2 | 8/2006 | Steffie et al. | |
| 7,190,124 B2 | 3/2007 | Kumar et al. | |
| 7,242,150 B2 | 7/2007 | DeJonge et al. | |
| 7,285,919 B2 | 10/2007 | Newman, Jr. et al. | |
| 7,312,582 B2 * | 12/2007 | Newman et al. | 315/200 R |
| 7,358,627 B2 | 4/2008 | Black et al. | |
| 7,423,413 B2 | 9/2008 | Dobbins et al. | |
| 7,432,661 B2 | 10/2008 | Taipale et al. | |
| 7,436,123 B2 | 10/2008 | Hamamoto et al. | |
| 7,446,486 B2 | 11/2008 | Steffie et al. | |
| 7,546,473 B2 * | 6/2009 | Newman | 713/300 |
| 7,667,991 B2 | 2/2010 | Leyh | |
| 7,868,561 B2 | 1/2011 | Weightman et al. | |
| 8,067,926 B2 | 11/2011 | Carmen | |
| 2003/0031037 A1 * | 2/2003 | Piaskowski | 363/125 |
| 2003/0034763 A1 * | 2/2003 | Bruno | 323/282 |
| 2004/0206616 A1 | 10/2004 | Leopold et al. | |
| 2004/0251884 A1 * | 12/2004 | Steffie et al. | 323/282 |
| 2005/0018458 A1 * | 1/2005 | Shimada et al. | 363/125 |
| 2005/0052887 A1 * | 3/2005 | Matsuo et al. | 363/127 |
| 2005/0157441 A1 | 7/2005 | Black | |
| 2005/0286271 A1 * | 12/2005 | Vinciarelli | 363/17 |
| 2006/0028191 A1 * | 2/2006 | Lee | 323/285 |
| 2006/0119187 A1 | 6/2006 | Newman, Jr. | |
| 2006/0176038 A1 * | 8/2006 | Flatness et al. | 323/282 |
| 2006/0238139 A1 | 10/2006 | Steffie et al. | |
| 2007/0001654 A1 | 1/2007 | Newman, Jr. | |
| 2007/0007937 A1 * | 1/2007 | Park et al. | 323/284 |
| 2007/0069705 A1 * | 3/2007 | Umminger | 323/282 |
| 2007/0114950 A1 | 5/2007 | Matsumura | |
| 2007/0296347 A1 | 12/2007 | Mosebrook et al. | |
| 2008/0019154 A1 * | 1/2008 | Lanni | 363/36 |
| 2008/0031021 A1 * | 2/2008 | Ros et al. | 363/46 |
| 2008/0094010 A1 | 4/2008 | Black | |
| 2008/0112198 A1 * | 5/2008 | Cheah et al. | 363/84 |
| 2008/0258650 A1 | 10/2008 | Steiner et al. | |
| 2008/0278297 A1 | 11/2008 | Steiner et al. | |
| 2012/0187932 A1 * | 7/2012 | Singnurkar | 323/282 |

* cited by examiner

POWER SUPPLY FOR A LOAD CONTROL DEVICE

CROSS REFERENCE TO RELATED APPLICATIONS

This application is a continuation of commonly-assigned U.S. patent application Ser. No. 12/328,906, filed Dec. 5, 2008, entitled POWER SUPPLY FOR A LOAD CONTROL DEVICE, now U.S. Pat. No. 8,067,926, issued Nov. 29, 2011, which claims priority from U.S. Provisional Application Ser. No. 61/015,965, filed Dec. 21, 2007, entitled POWER SUPPLY FOR A LOAD CONTROL DEVICE, the entire disclosures of which are hereby incorporated by reference.

BACKGROUND OF THE INVENTION

1. Field of the Invention

The present invention relates to a power supply for a load control device, and more particularly, to a power supply for a load control device of a multiple location load control system, where the power supply draws a substantially symmetrical current, while powering an electrical load drawing an asymmetrical current.

2. Description of the Related Art

A conventional two-wire dimmer has two connections: a "hot" connection to an alternating-current (AC) power supply and a "dimmed hot" connection to the lighting load. Standard dimmers use one or more semiconductor switches, such as triacs or field effect transistors (FETs), to control the current delivered to the lighting load and thus to control the intensity of the light. The semiconductor switches are typically coupled between the hot and dimmed hot connections of the dimmer.

Smart wall-mounted dimmers may include a user interface typically having a plurality of buttons for receiving inputs from a user and a plurality of status indicators for providing feedback to the user. These smart dimmers typically include a microprocessor or other processing device for allowing an advanced set of control features and feedback options to the end user. An example of a smart dimmer is disclosed in commonly assigned U.S. Pat. No. 5,248,919, issued on Sep. 28, 1993, entitled LIGHTING CONTROL DEVICE, which is herein incorporated by reference in its entirety.

In order to provide a direct-current (DC) voltage $V_{CC}$ to power the microprocessor and other low-voltage circuitry, the smart dimmers typically include cat-ear power supplies. A cat-ear power supply draws current only near the zero-crossings of the AC source voltage and derives its name from the shape of the current waveform that it draws from the AC voltage source. Because the smart dimmer only has two terminals, the power supply must draw current through the connected lighting load. In order for the power supply to be able to draw sufficient current, the semiconductor switch must be non-conductive so that a sufficient voltage is available across the power supply. Thus, the semiconductor cannot be turned on for the entire length of a half-cycle, even when the maximum voltage across the lighting load is desired.

Sometimes, the power supplies of the smart dimmers are required to provide power to electrical loads that draw asymmetrical currents, for example, to an electrical load that draws a greater amount of current during the positive half-cycles than the negative half-cycles. In response to a load drawing an asymmetrical current, the prior art power supply causes a corresponding asymmetrical current to flow through the electrical load. If the electrical load is sensitive to asymmetrical currents, such as a magnetic low-voltage (MLV) lighting load, the lighting load may generate acoustic noise, which is undesirable. For example, acoustic noise may be generated if the current through the MLV lighting load has a DC component of approximately 0.3-0.4 A.

Accordingly, there is a need for a power supply for a load control device that is operable to draw a symmetrical current, while providing power to an electrical load that is drawing an asymmetrical current.

SUMMARY OF THE INVENTION

According to an embodiment of the present invention, a power supply is operable to generate a DC output voltage for powering a remote control device and comprises an energy storage element, a controllably conductive switching circuit, a threshold detect circuit, and a latching circuit coupled to the controllably conductive switching circuit. The power supply is used in a load control device for controlling the amount of power delivered to an electrical load from an AC power source. The output voltage is generated across the energy storage element, and the energy storage element is arranged to conduct an asymmetrical output current through the remote control device. The controllably conductive switching circuit of the power supply is coupled in series electrical connection with the energy storage element, and is configured to conduct a charging current from the AC power source through the energy storage element for charging the energy storage element to produce the output voltage. The controllably conductive switching circuit is configured to become conductive after the magnitude of the AC voltage waveform exceeds approximately the magnitude of the DC voltage waveform during a half-cycle of the AC voltage waveform. The threshold detect circuit receives a first control signal representative of the magnitude of the output voltage and a second control signal representative of the amount of time that the energy storage element has been charging during the half-cycle. The latching circuit is configured to cause coupled to the controllably conductive switching circuit and the threshold detect circuit. The latching circuit causes the controllably conductive switching circuit to become non-conductive in response to the magnitude of the output voltage and the amount of time that the energy storage element has been charging during the half-cycle, resulting in the magnitude of the charging current conducted from the AC power source through the energy storage element being approximately the same each half-cycle.

As described herein, a load control device is configured to control the power delivered to an electrical load from an AC power source in response to a remote control device. The load control device and the remote control device may both conduct a load current from the AC power source to the electrical load without a neutral connection to the neutral side of the AC power source. The remote control device is adapted to be further coupled to the load control device through an accessory wiring. The load control device comprises a bidirectional semiconductor switch adapted to be coupled in series between the source and the load for controlling the power delivered to the load, and a controller coupled to a control input of the bidirectional semiconductor switch for controlling the power delivered to the load. The load control device further comprises a power supply for generating a link voltage for powering the remote control device via the accessory wiring, the power supply conducting an asymmetrical output current, and drawing a substantially symmetrical input current from the AC power source.

Other features and advantages of the present invention will become apparent from the following description of the invention that refers to the accompanying drawings.

BRIEF DESCRIPTION OF THE DRAWINGS

For the purpose of illustrating the invention, there is shown in the drawings a form, which is presently preferred, it being understood, however, that the invention is not limited to the precise arrangements and instrumentalities shown. The features and advantages of the present invention will become apparent from the following description of the invention that refers to the accompanying drawings, in which.

DETAILED DESCRIPTION OF EMBODIMENTS OF THE INVENTION

Figure 1:
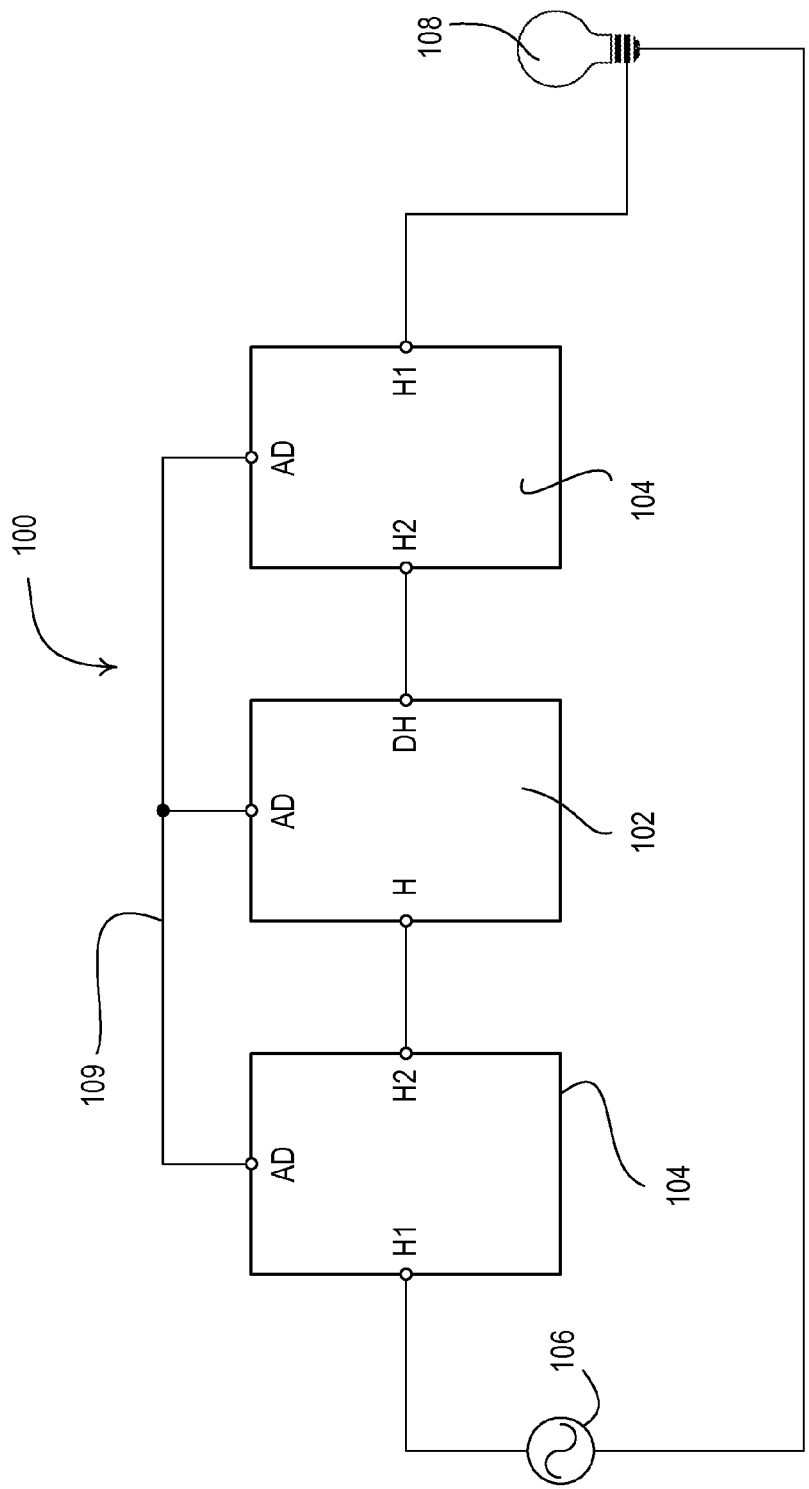
FIG. 1 is a simplified block diagram of a multiple location dimming system having a main dimmer and two remote dimmers.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 1 is a simplified block diagram of a multiple location dimming system 100. As shown in FIG. 1, a main dimmer 102 and two remote dimmers 104 (i.e., accessory dimmers) are coupled in series electrical connection between an AC power source 106 and a lighting load 108. The main dimmer 102 includes a hot terminal H (i.e., a line-side load terminal) adapted to be coupled to the line-side of the system 100 and a dimmed-hot terminal DH (i.e., a load-side terminal) adapted to be coupled to the load-side of the system 100. The main dimmer further comprises a load control circuit coupled between the hot and dimmed-hot terminals for controlling the amount of power delivered to the lighting load 108 (as will described in greater detail with reference to FIG. 3). The remote dimmers 104 include two hot terminals H1, H2, which conduct the load current from the AC power source 106 to the lighting load 108. The main dimmer 102 and the remote dimmers 104 each comprise accessory dimmer terminals AD coupled together via a single accessory dimmer (AD) line 109 (i.e., an accessory wiring). The main dimmer 102 and the remote dimmers 104 are operable to communicate, i.e., transmit and receive digital messages, via the AD line 109. The main dimmer 102 and the remote dimmers 104 do not require connections to the neutral side of the AC power source 106.

The main dimmer 102 may be wired into any location of the multiple location dimming system 100. For example, the main dimmer 102 may be wired in the middle of the two remote dimmers 104, i.e., a first remote dimmer may be wired to the line side of the system 100 and a second remote dimmer may be wired to the load side of the system 100 (as shown in FIG. 1). Alternatively, the main dimmer 102 may be wired to the line side or the load side of the system 100. Further, more than two remote dimmers 104 (e.g., up to four remote dimmers) may be provided in the multiple location dimming system 100.

The main dimmer 102 and the remote dimmer 104 all include actuators and visual displays, such that lighting load 108 may be controlled from and feedback of the lighting load may be provided at each of the main dimmer 102 and the remote dimmers 104. In order to provide the visual displays at the remote dimmers 104, the remote dimmers each include a controller (e.g., a microprocessor) and a power supply for powering the microprocessor. The main dimmer 102 provides an AD supply voltage $V_{AD}$ (e.g., approximately 80 $V_{DC}$) on the AD line 109 to enable the power supplies of the remote dimmers 104 to charge during a first portion (i.e., a remote dimmer power supply charging time period $T_{CHRG}$) of each half-cycle of the AC power source 106. During a second portion (i.e., a communication time period $T_{COMM}$) of each half-cycle, the main dimmer 102 and the remote dimmers 104 are operable to transmit and receive the digital messages via the AD line 109.

Figure 2:
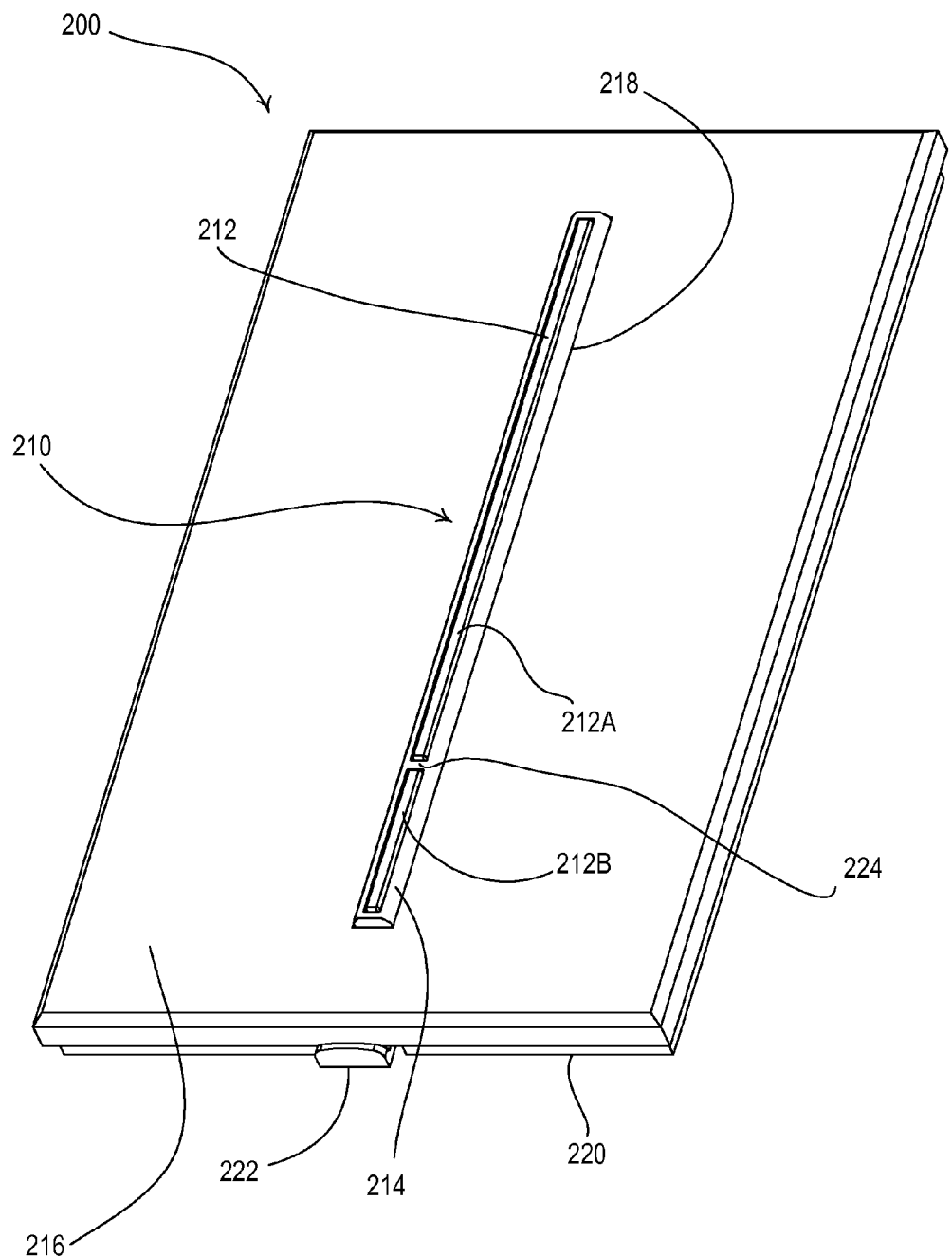
FIG. 2 is a perspective view of a user interface of the main dimmer and the remote dimmers of the system of FIG. 1.

FIG. 2 is a perspective view of a user interface 200 of the main dimmer 102 and the remote dimmers 104. The user interface 200 includes a thin touch sensitive actuator 210 comprising an actuation member 212 having first and second portions 212A, 212B. The actuation member 212 extends through a bezel 214 to contact a touch sensitive device (not shown) located inside the main dimmer 102 (and the remote dimmers 104). The main dimmer 102 is operable to control the intensity of a connected lighting load 108 in response to actuations of the actuation member 212 of either the main dimmer 102 or the remote dimmers 104.

The user interface 200 further comprises a faceplate 216, which has a non-standard opening 218 and mounts to an adapter 220. The bezel 214 is housed behind the faceplate 216 and extends through the opening 218. The adapter 220 connects to a yoke (not shown), which is adapted to mount the main dimmer 102 and the remote dimmers 104 to standard electrical wallboxes. An air-gap actuator 222 allows for actuation of an internal air-gap switch 322 (FIG. 3) by pulling the air-gap actuator down.

The bezel 214 comprises a break 224, which separates the lower portion 212A and the upper portion 212B of the actuation member 212. Upon actuation of the lower portion 212B of the actuation member 212, the main dimmer 102 causes the connected lighting load 108 to toggle from on to off (and vice versa). Actuation of the upper portion 212A of the actuation member 212, i.e., above the break 224, causes the intensity of the lighting load 108 to change to a level dependent upon the position of the actuation along the length of the actuation member 212.

A plurality of visual indicators, e.g., a plurality of light-emitting diodes (LEDs), are arranged in a linear array behind the actuation member 212. The actuation member 212 is substantially transparent, such that the LEDs are operable to illuminate portions of the actuation member. Two different color LEDs may be located behind the lower portion 212B, such that the lower portion is illuminated, for example, with blue light when the lighting load 108 is on and with orange light with the lighting load is off. The LEDs behind the upper portion 212A are, for example, blue and are illuminated as a bar graph to display the intensity of the lighting load 108 when the lighting load is on.

The touch sensitive actuator 210 of the user interface 200 is described in greater detail in co-pending commonly-assigned U.S. patent application Ser. No. 11/471,908, filed Jun. 20, 2006, entitled TOUCH SCREEN ASSEMBLY FOR A LIGHTING CONTROL, and U.S. Provisional Patent Application Ser. No. 60/925,821, filed Apr. 23, 2007, entitled LOAD CONTROL DEVICE HAVING A MODULAR ASSEMBLY. The entire disclosures of both patent applications are hereby incorporated by reference.

Figure 3:
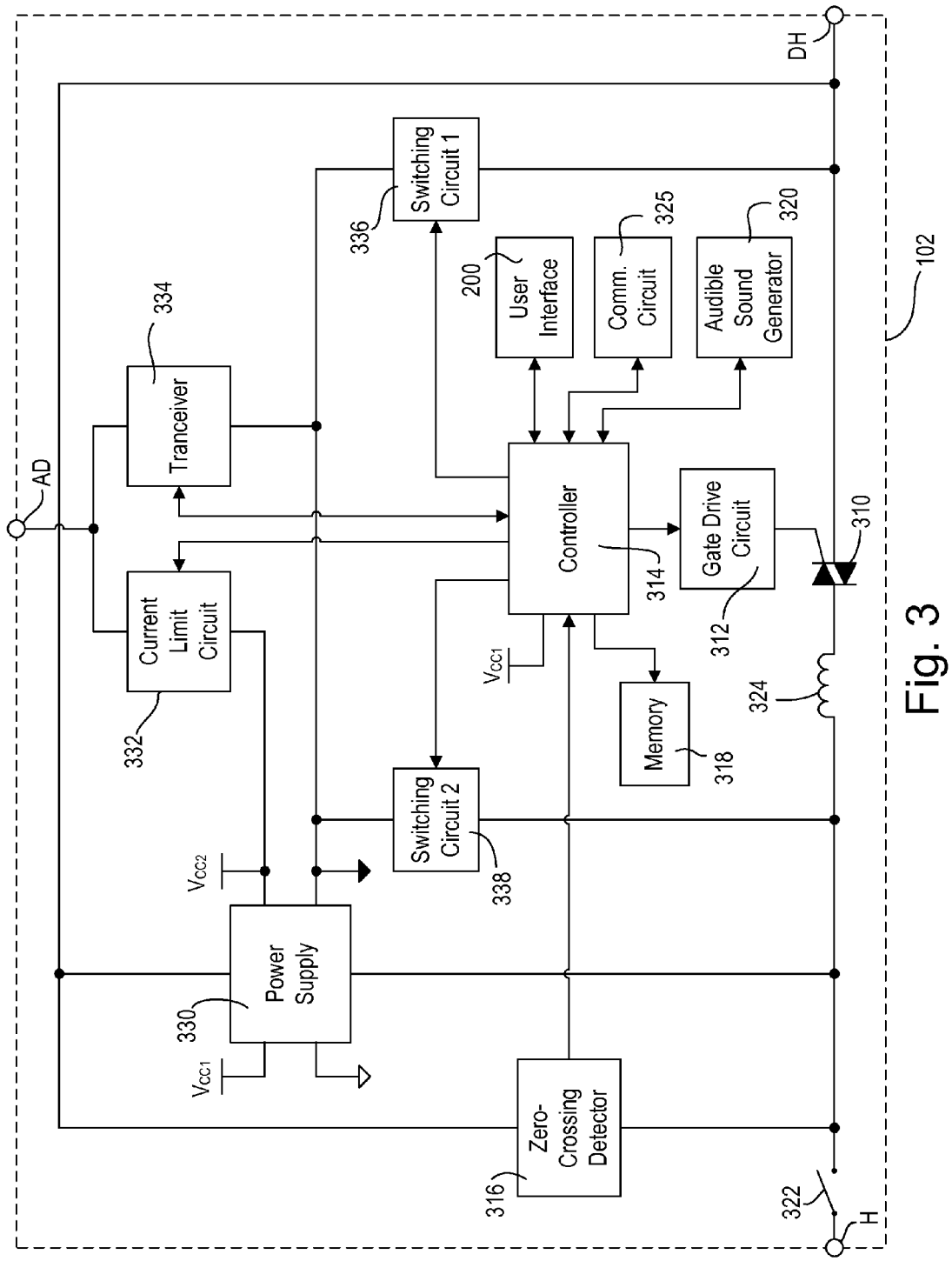
FIG. 3 is a simplified block diagram of the main dimmer of the system of FIG. 1.

FIG. 3 is a simplified block diagram of the main dimmer 102 of the multiple location dimming system 100. The main dimmer 102 employs a bidirectional semiconductor switch 310, e.g., a triac, coupled between the hot terminal H and the dimmed hot terminal DH, to control the current through, and thus the intensity of, the lighting load 108. The semiconductor switch 310 could alternatively be implemented as any suitable bidirectional semiconductor switch, such as, for example, a FET in a full-wave rectifier bridge, two FETs in anti-series connection, or one or more insulated-gate bipolar junction transistors (IGBTs). The semiconductor switch 310 has a control input (or gate), which is connected to a gate drive circuit 312. The input to the gate renders the semiconductor switch 310 selectively conductive or non-conductive, which in turn controls the power supplied to the lighting load 108.

A controller 314 is operable to control the semiconductor switch 310 by providing a control signal to the gate drive circuit 312. The controller 314 may be any suitable controller, such as a microcontroller, a microprocessor, a programmable logic device (PLD), or an application specific integrated circuit (ASIC). The controller is coupled to a zero-crossing detect circuit 316, which determines the zero-crossing points of the AC line voltage from the AC power supply 106. The controller 314 generates the gate control signals to operate the semiconductor switch 210 to thus provide voltage from the AC power supply 106 to the lighting load 108 at predetermined times relative to the zero-crossing points of the AC line voltage.

The user interface 600 is coupled to the controller 314, such that the controller is operable to receive inputs from the touch sensitive actuator 210 and to control the LEDs to provide feedback of the amount of power presently being delivered to the lighting load 108. The electrical circuitry of the user interface 600 is described in greater detail in co-pending, commonly-assigned U.S. patent application Ser. No. 11/471, 914, filed Jun. 20, 2006, entitled FORCE INVARIANT TOUCH SCREEN, the entire disclosure of which is hereby incorporated by reference.

The main dimmer 102 further comprises an audible sound generator 318 coupled to the controller 314. The controller 314 is operable to cause the audible sound generator 318 to produce an audible sound in response to an actuation of the touch sensitive actuator 210. A memory 320 is coupled to the controller 314 and is operable to store control information of the main dimmer 102.

The air-gap switch 322 is coupled in series between the hot terminal H and the semiconductor switch 310. The air-gap switch 322 has a normally-closed state in which the semiconductor switch 310 is coupled in series electrical connection between the AC power source 106 and the lighting load 108. When the air-gap switch 322 is actuated (i.e., in an open state), the air-gap switch provides an actual air-gap break between the AC power source 106 and the lighting load 108. The air-gap switch 322 allows a user to service the lighting load 108 without the risk of electrical shock. The main dimmer 102 further comprises an inductor 324, i.e., a choke, for providing electromagnetic interference (EMI) filtering.

The main dimmer 102 includes a power supply 330, which may provide both isolated and non-isolated DC output voltages. The power supply 330 only draws current at the beginning of each half-cycle while the bidirectional semiconductor switch 310 is non-conductive. The power supply 330 stops drawing current when the bidirectional semiconductor switch 310 is rendered conductive. The power supply 330 supplies a first isolated DC output voltage $V_{CC1}$ (e.g., 3.4 $V_{DC}$) for powering the controller 314 and other low voltage circuitry of the main dimmer 102. The power supply 330 also generates a second non-isolated DC output voltage $V_{CC2}$ (e.g., 80 $V_{DC}$), for providing power for the AD line 109 as will be described in greater detail below. The power supply supply 330 also may provide a third non-isolated DC output voltage $V_{CC3}$ (e.g., 12 $V_{DC}$) and a fourth non-isolated DC output voltage $V_{CC4}$ (e.g., 5 $V_{DC}$), which are not shown in FIG. 3. The second, third, and fourth non-isolated voltages $V_{CC2}$, $V_{CC3}$, $V_{CC4}$ are all referenced to a non-isolated circuit common.

A current limit circuit 332 is coupled between the second DC output voltage $V_{CC2}$ of the power supply 330 and the accessory dimmer terminal AD (via an output connection CL_OUT) to provide the AD supply voltage $V_{AD}$ to the remote dimmers 104. The current limit circuit 332 limits the magnitude of the current provided to the remote dimmers 104 to charge the internal power supplies. The controller 314 is operable to adjust the current limit value of the current limit circuit 332 to a first current limit level (e.g., approximately 150 mA) during the remote dimmer power supply charging time period $T_{CHRG}$ each half-cycle to limit the current that the remote dimmers 104 can draw to charge their internal power supplies. The controller 314 is further operable to adjust the current limit to a second current limit level (e.g., 10 mA) during the communication time period $T_{COMM}$ each half-cycle. The controller 314 provides a control signal I_LIMIT to the current limit circuit 332 to adjust the current limit between the first and second current limit levels.

A transceiver 334 allows for the communication of digital message between the main dimmer 102 and the remote dimmer 104. The transceiver 334 is coupled to the accessory dimmer terminal AD (via a connection TX/RX). The transceiver 334 comprises a transmitter 500 (FIG. 5) for transmitting digital signals on the AD line 109 and a receiver 520 (FIG. 5) for receiving digital signals from the remote dimmers 104 coupled to the AD line. The controller 314 processes the received digital messages RX_SIG from the receiver 510 and provides the digital messages TX_SIG to be transmitted to the transmitter 500.

The main dimmer 330 further comprises first and second switching circuits 336, 338. The switching circuits 336, 338 are coupled to the dimmed-hot terminal DH and the hot terminal H (through the air-gap switch 322), respectively. The controller 314 provides a first control signal SW1_CTL to the first switching circuit 336 and a second control signal SW2_CTL to second switching circuit 338. The controller 314 controls the switching circuits 336, 338 to be conductive and non-conductive on a complementary basis. During the positive half-cycles, the controller 314 controls the first switching circuit 336 to be conductive, such that the power supply 330, the current limit circuit 332, and the transceiver 334 are coupled between the accessory dimmer terminal AD and the dimmed-hot terminal DH. This allows the remote dimmer 104 on the load side of the system 100 to charge the internal power supplies and transmit and receive digital messages during the positive half-cycles. During the negative half-cycles, the controller 314 controls the second switching circuit 338 to be conductive, such that the power supply 330, the current limit circuit 332, and the transceiver 334 are coupled between the accessory dimmer terminal AD and the hot terminal H to allow the remote dimmers 104 on the line side of the system 100 to charge their power supplies and communicate on the AD line 109. Accordingly, the first and second switching circuits provide first and second charging paths for the internal power supplies of the load-side and line-side remote dimmers 104, respectively, which both may be enabled by the controller 314.

The main dimmer 102 may also comprise another communication circuit 325 (in addition to the transceiver 334) for transmitting or receiving digital messages via a communications link, for example, a wired serial control link, a power-line carrier (PLC) communication link, or a wireless communication link, such as an infrared (IR) or a radio frequency (RF) communication link. An example of an RF communication link is described in commonly assigned U.S. Pat. No. 5,905,442, issued May 18, 1999, entitled METHOD AND APPARATUS FOR CONTROLLING AND DETERMINING THE STATUS OF ELECTRICAL DEVICES FROM REMOTE LOCATIONS, the entire disclosure of which is hereby incorporated by reference.

Figure 4:
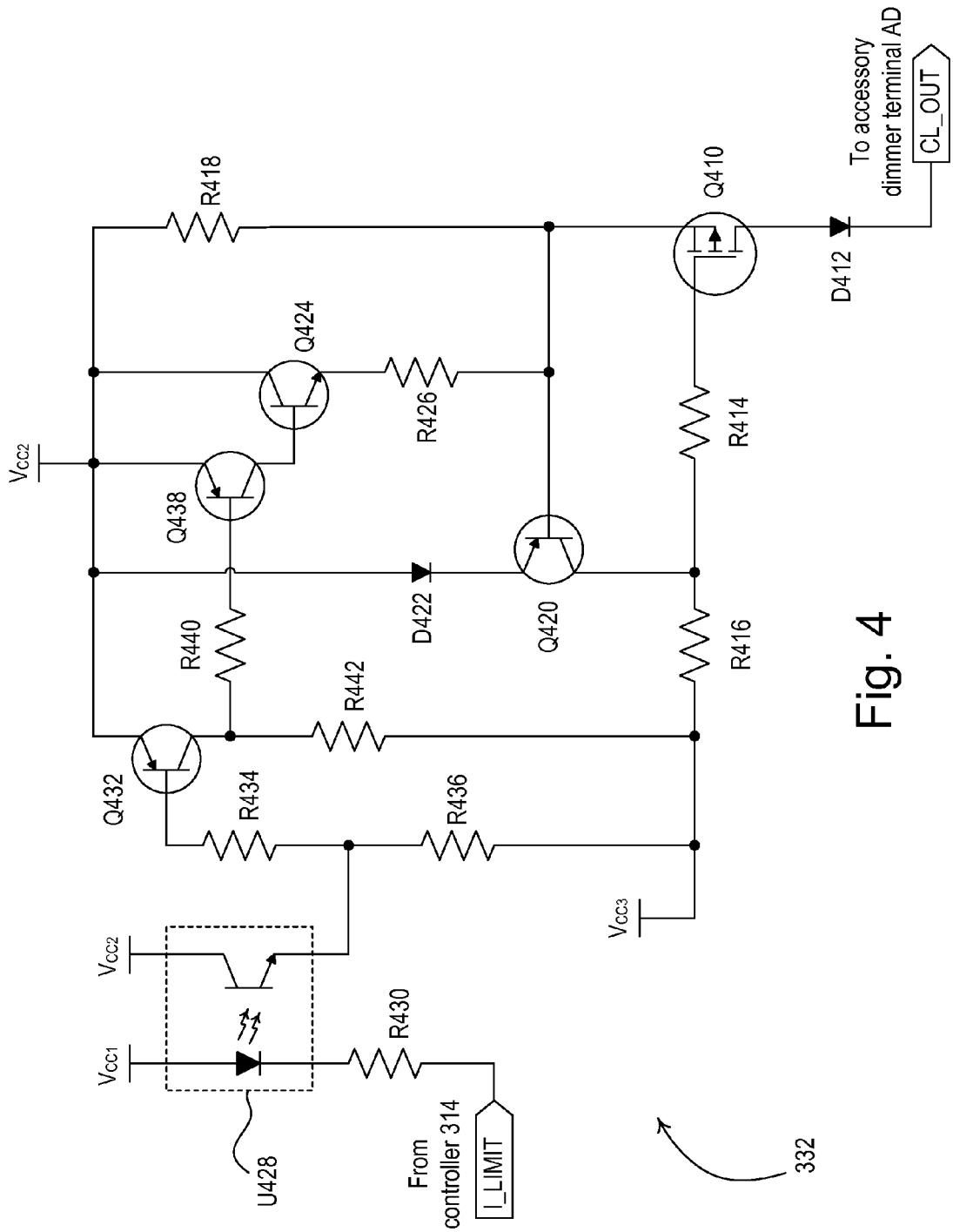
FIG. 4 is a simplified schematic diagram of a current limit circuit of the main dimmer of FIG. 3.

FIG. 4 is a simplified schematic diagram of the current limit circuit 332. The current limit circuit 332 limits the current conducted through the accessory dimmer terminal AD. The current through the output connection CL_OUT of the current limit circuit 332 is conducted from the second non-isolated DC voltage $V_{CC2}$ through a FET Q410 and a diode D412. The current limit circuit 332 is operable to limit the current to two discrete current limit levels, i.e., approximately 150 mA and 10 mA, which are controlled in response to the control signal I_LIMIT from the controller 314. During normal operation (i.e., when the current through the output connection CL_OUT is not exceeding either of the current limit levels), the gate of the FET Q410 is coupled to the third non-isolated DC voltage $V_{CC3}$ via two resistors R414, R416 (e.g., having resistances of approximately 10 kΩ and 470 kΩ, respectively). Accordingly, the voltage at the gate of the FET Q410 is set at the appropriate level such that the FET is conductive. For example, the FET Q440 is part number BSP317P, manufactured by Infineon Technologies.

When the control signal I_LIMIT is high (i.e., at approximately the magnitude of the first isolated DC voltage $V_{CC1}$), the current through the output connection CL_OUT of the current limit circuit 332 is limited to approximately 10 mA. At this time, the current through the output connection CL_OUT is conducted from the second non-isolated DC voltage $V_{CC2}$ to the FET Q410 through a first current limit resistor R418 (e.g., having a resistance of 220 Ω). When the current increases to approximately 10 mA, the voltage developed across the resistor R418 exceeds approximately the base-emitter voltage of a PNP bipolar junction transistor (BJT) Q420 plus the forward voltage of a diode D422. Accordingly, the transistor Q420 becomes conductive, thus pulling the gate of the FET Q410 up towards the second non-isolated DC voltage $V_{CC2}$. This causes the FET Q410 to become non-conductive, thus limiting the current through the output connection CL_OUT to approximately 10 mA. For example, the transistor Q420 is part number MBT3906DW, manufactured by On Semiconductor.

When the control signal I_LIMIT is pulled low to circuit common (i.e., to approximately zero volts), the current limit is alternatively set at 150 mA. Specifically, an NPN bipolar junction transistor Q424 is rendered conductive to couple a second current limit resistor R426 in parallel electrical connection with the first current limit resistor. The second current limit resistor R426 has, for example, a resistance of 3.01 kΩ, such that the resulting equivalent resistance coupled in series between the second non-isolated DC voltage $V_{CC2}$ and the FET Q410 causes the current limit level to increase to approximately 150 mA. For example, the transistor Q424 is part number MPSA06, manufactured by On Semiconductor.

An input photodiode of an optocoupler U428 is coupled in series with a resistor R430 (e.g., having a resistance of 2.2 kΩ) between the first isolated DC output voltage $V_{CC1}$ and the control signal I_LIMIT. An output phototransistor of the optocoupler U428 is coupled to the base of a PNP bipolar junction transistor Q432 (e.g., part number BC856BW, manufactured by Philips Semiconductors) through a resistor R434. While the control signal I_LIMIT is high, the base of the transistor Q432 is pulled down towards the third non-isolated DC voltage $V_{CC3}$ through the resistor R434 and a resistor R436 (e.g., having resistances of 4.7 kΩ and 220 kΩ, respectively). For example, the optocoupler U428 is part number PS2811, manufactured by NEC Electronics Corporation.

When the control signal I_LIMIT is pulled low, the voltage at the base of the transistor Q432 is pulled up towards the second non-isolated DC voltage $V_{CC2}$, such that the transistor Q432 becomes non-conductive. Accordingly, the voltage at the base of a PNP bipolar junction transistor Q438 is pulled down towards the third non-isolated DC voltage $V_{CC3}$ through two resistors R440, R442 (e.g., having resistances of 4.7 kΩ and 470 kΩ, respectively). Thus, the transistor Q438 becomes conductive and pulls the base of the transistor Q424 up towards the second non-isolated DC voltage $V_{CC2}$, such that the transistor Q424 is conductive and the second current limit resistor R426 is coupled in parallel with the first current limit resistor R418.

Figure 5:
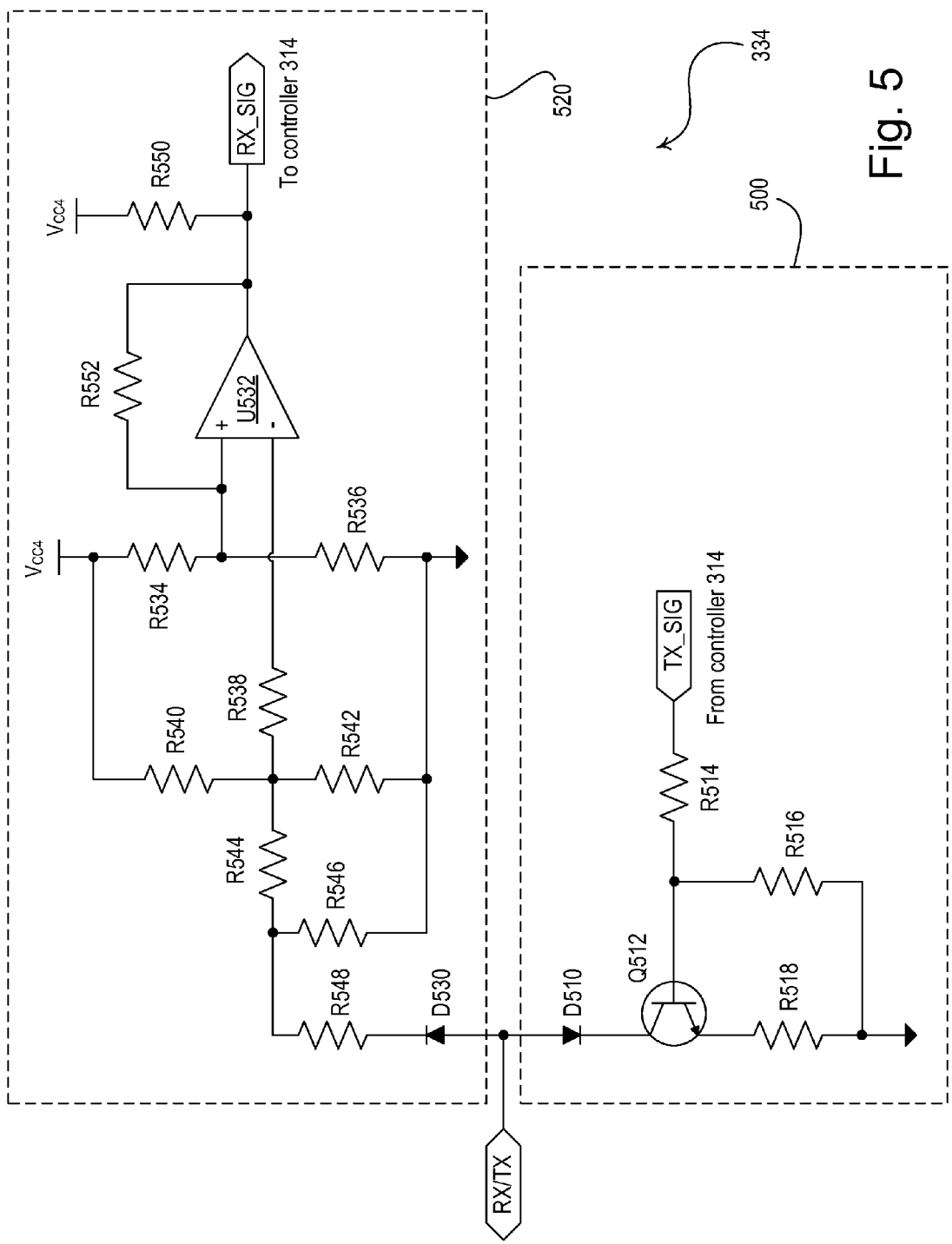
FIG. 5 is a simplified diagram of a transceiver of the main dimmer of FIG. 3.

FIG. 5 is a simplified schematic diagram of the transceiver 334, which comprises the transmitter 500 and the receiver 520. The transmitter 500 and the receiver 520 are coupled to the connection RX/TX through two diodes D510, D530, such that current is only operable to flow from the accessory dimmer terminal AD into the transmitter 500 and the receiver 520. The transmitter 500 comprises an NPN bipolar junction transistor Q512 coupled to the accessory dimmer terminal AD through the diode D510. For example, the transistor Q512 is part number MMBT6517, manufactured by On Semiconductor.

The controller 314 is operable to transmit digital messages on the AD line 109 by controlling the transistor Q512 to be conductive and non-conductive. The digital messages TX_SIG to be transmitted are provided from the controller 314 to the base of the transistor Q512 via a resistor R514 (e.g., having a resistance of 10 kΩ). The base of the transistor Q512 is also coupled to the non-isolated circuit common through a resistor R516 (e.g., having a resistance of 56 kΩ). The emitter of the transistor Q512 is coupled to the non-isolated circuit common through a resistor R518 (e.g., having a resistance of 220Ω). When the digital message TX_SIG provided by the controller 314 is low, the transistor Q512 remains non-conductive. When the digital message TX_SIG provided by the controller 314 is high (i.e., at approximately the fourth non-isolated DC voltage $V_{CC4}$), the transistor Q512 is rendered conductive, thus "shorting" the AD line 109, i.e., reducing the magnitude of the voltage on the AD line to substantially zero volts. The resistor R518 limits the magnitude of the current that flows through the accessory dimmer terminal AD when the transistor Q512 is conductive.

The controller 314 is operable to receive digital messages from the AD line 109 via the receiver 520. The receiver 520 comprises a comparator U532 having an output that provides the received digital messages RX SIG to the controller 314. The comparator U532 may be, for example, part number LM2903, manufactured by National Semiconductor. Two resistors R534, R536 are coupled in series between the DC voltage $V_{CC4}$ and circuit common and have, for example, resistances of 68.1 kΩ and 110 kΩ, respectively. A reference voltage $V_{REF}$ is generated at the junction of the resistors R534, R536 and is provided to a non-inverting input of the comparator U532. An inverting input of the comparator U532 is coupled to the accessory dimmer terminal AD through a network of resistors R538, R540, R542, R544, R546, R548. For example, the resistors R538, R540, R542, R544, R546, R548 have resistances of 220 kΩ, 68.1 kΩ, 220 kΩ, 47.5 kΩ, 20 kΩ, and 220 kΩ, respectively. The output of the comparator U532 is coupled to the DC voltage $V_{CC4}$ via a resistor R550 (e.g., having a resistance of 4.7 kΩ).

The output of the comparator U532 is also coupled to the non-inverting input via a resistor R552 to provide some hysteresis. The resistor R552 has, for example, a resistance of 820 kΩ, such that when the output of the comparator U532 is pulled high to the DC voltage $V_{CC4}$, the reference voltage $V_{REF}$ at the non-inverting input of the comparator U532 has a magnitude of approximately 3.1 V. When the output of the comparator U532 is driven low, the reference voltage $V_{REF}$ has a magnitude of approximately 2.9 V.

If neither the main dimmer 102 nor the remote dimmers 104 are shorting out the AD line 109, the second non-isolated DC output voltage $V_{CC2}$ (i.e., 80 $V_{DC}$) is present at the accessory dimmer terminal AD of the main dimmer 102. Accordingly, the inverting input of the comparator U532 is pulled up to a voltage of approximately 5 V. Since the voltage at the inverting input of the comparator U532 is greater than the reference voltage $V_{REF}$ at the non-inverting input, the output of the comparator is driven low to circuit common (i.e., approximately zero volts). When either the main dimmer 102 or one of the remote dimmer 104 shorts out the AD line 109, the voltage at the non-inverting input of the comparator U532 is pulled down below the reference voltage $V_{REF}$, e.g., to approximately 2.2 V, such that the output of the comparator is pulled up to approximately the DC voltage $V_{CC4}$.

Figure 6:
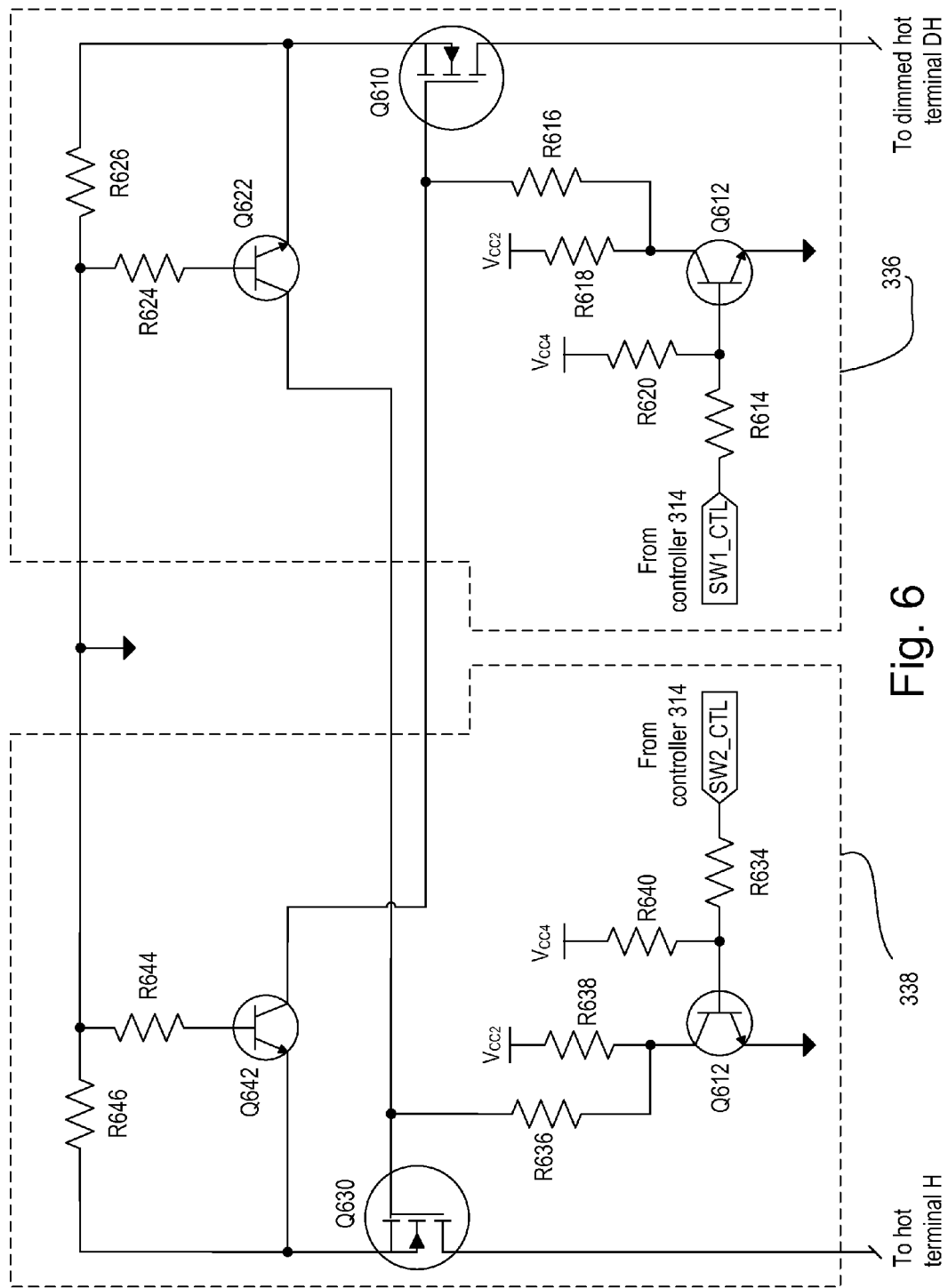
FIG. 6 is a simplified schematic diagram of switching circuits of the main dimmer of FIG. 3.

FIG. 6 is a simplified schematic diagram of the switching circuit 336, 338. The first switching circuit 336 is coupled between the dimmed-hot terminal DH and the non-isolated circuit common. The second switching circuit 338 is coupled between the hot terminal H and the non-isolated circuit common. During the positive half-cycles, the controller 314 controls the first switching circuit 336 to be conductive and non-conductive via the first control signal SW1_CTL. During the negative half-cycles, the controller 314 controls the second switching circuit 338 to be conductive and non-conductive via the second control signal SW2_CTL.

The first switching circuit 336 comprises a FET 610, which conducts current from the non-isolated circuit common to the dimmed-hot terminal. The FET 610 may be, for example, part number STN1NK60, manufactured by ST Microelectronics, and has a maximum voltage rating of 600 V. The first control signal SW1_CTL is coupled to the base of an NPN bipolar transistor Q612 via a resistor R614 (e.g., having a resistance of 1 kΩ). For example, the transistor Q612 may be part number MBT3904DW, manufactured by On Semiconductor. When the first control signal SW1_CTL is low (i.e., at approximately zero volts), the transistor Q612 is non-conductive, which allows the gate of the FET Q610 to be pulled up to approximately the second non-isolated DC voltage $V_{CC2}$ via two resistors R616, R618, thus rendering the FET 610 conductive. The resistors R614, R616 have, for example, resistances of 22 kΩ and 470 kΩ, respectively. When the first control signal SW1 CTL is high, the base of the transistor Q612 is pulled up to approximately the fourth isolated DC voltage $V_{CC4}$ via a resistor R620 (e.g., having a resistance of 100 kΩ). Accordingly, the transistor Q612 is conductive and the gate of the FET 610 is pulled low towards circuit common, thus rendering the FET 610 non-conductive.

The second switching circuit 338 comprises a FET 630, which is operable to conduct current from the non-isolated circuit common to the hot terminal. The second switching circuit 338 includes a similar driving circuit as the first switching circuit 336 for rendering the FET 630 conductive and non-conductive.

When the FET 610 of the first switching circuit 336 is conductive, the FET 630 of the second switching circuit is rendered non-conductive. Specifically, the first switching circuit 336 includes an NPN bipolar transistor Q622 having a base coupled to the non-isolated circuit common through resistor R624 (e.g., having a resistance of 10 kΩ). When the FET 610 is conducting current from the non-isolated circuit common to the dimmed-hot terminal DH, a voltage is produced across a resistor R626, such that the transistor Q622 is rendered conductive. Accordingly, the gate of the FET 630 of the second switching circuit 338 is pulled away from the second non-isolated DC voltage $V_{CC2}$ to prevent the FET Q630 from being conductive while the FET 610 is conductive. Similarly, the second switching circuit 338 includes an NPN bipolar transistor Q642, which causes the FET 610 to be non-conductive when the FET 630 is conducting and the appropriate voltage is produced across a resistor R646.

Figure 7:
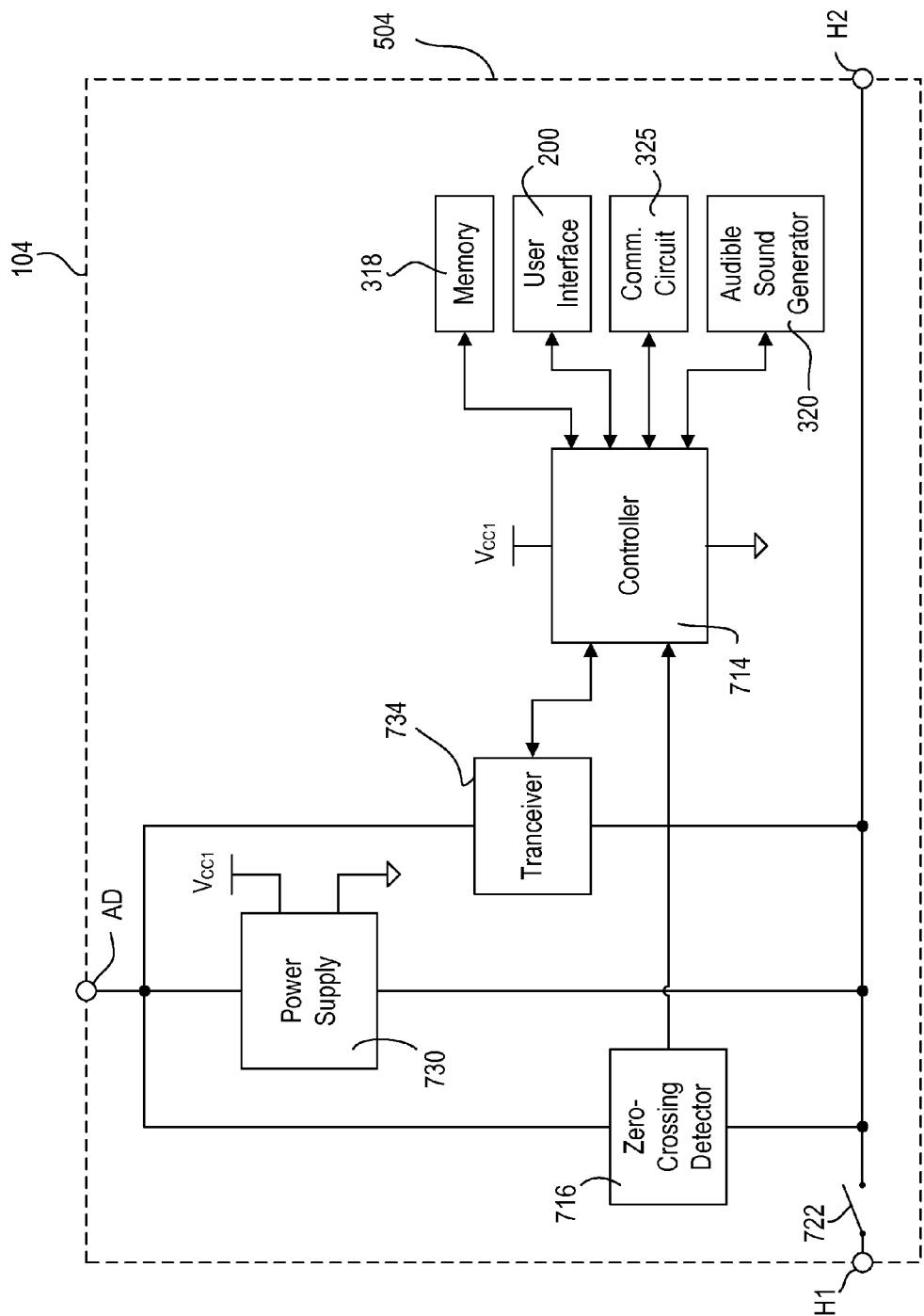
FIG. 7 is a simplified block diagram of the remote dimmers of the system of FIG. 1.

FIG. 7 is a simplified block diagram of one of the remote dimmers 104. The remote dimmer 104 includes many of the same functional blocks as the main dimmer 102. The remote dimmer 104 includes a controller 714, but does not include any load control circuitry (i.e., the bidirectional semiconductor switch 310 and the gate drive circuit 312). The remote dimmer 104 comprises first and second hot terminals H1, H2 that are coupled in series with the bidirectional semiconductor switch 310 of the main dimmer 102, and are adapted to conduct the load current from the AC power source 106 to the lighting load 108.

A power supply 730 is coupled between the accessory dimmer terminal AD and the second hot terminal H2 to draw power from the main dimmer 102 during the remote dimmer power supply charging time period $T_{CHRG}$ of each half-cycle. The power supply 730 only generates one isolated DC output voltage $V_{CC1}$ (e.g., 3.4 $V_{DC}$) for powering the controller 714 and other low voltage circuitry of the remote dimmer 104.

A zero-crossing detector 716 and a transceiver 734 are coupled between the accessory dimmer terminal AD and the second hot terminal H2. The zero-crossing detector 716 detects a zero-crossing when either of the first and second switching circuits 336, 338 change from non-conductive to conductive, thus coupling the AD supply voltage $V_{AD}$ across the zero-crossing detector. The controller 714 begins timing at each zero-crossing and is then operable to transmit and receive digital messages via the transceiver 734 after the end of the remote dimmer power supply charging time period $T_{CHRG}$. The transceiver 734 of the remote dimmer 104 is coupled in parallel with the transceiver 334 of the main dimmer 102 forming a communication path during the communication time period $T_{COMM}$ either in the positive or negative half-cycles depending on which side of the system 100 to which the remote dimmer is coupled. Accordingly, the communication path between the main dimmer 102 and the remote dimmers 104 does not pass through the AC power source 106 or the lighting load 108.

Figure 8:
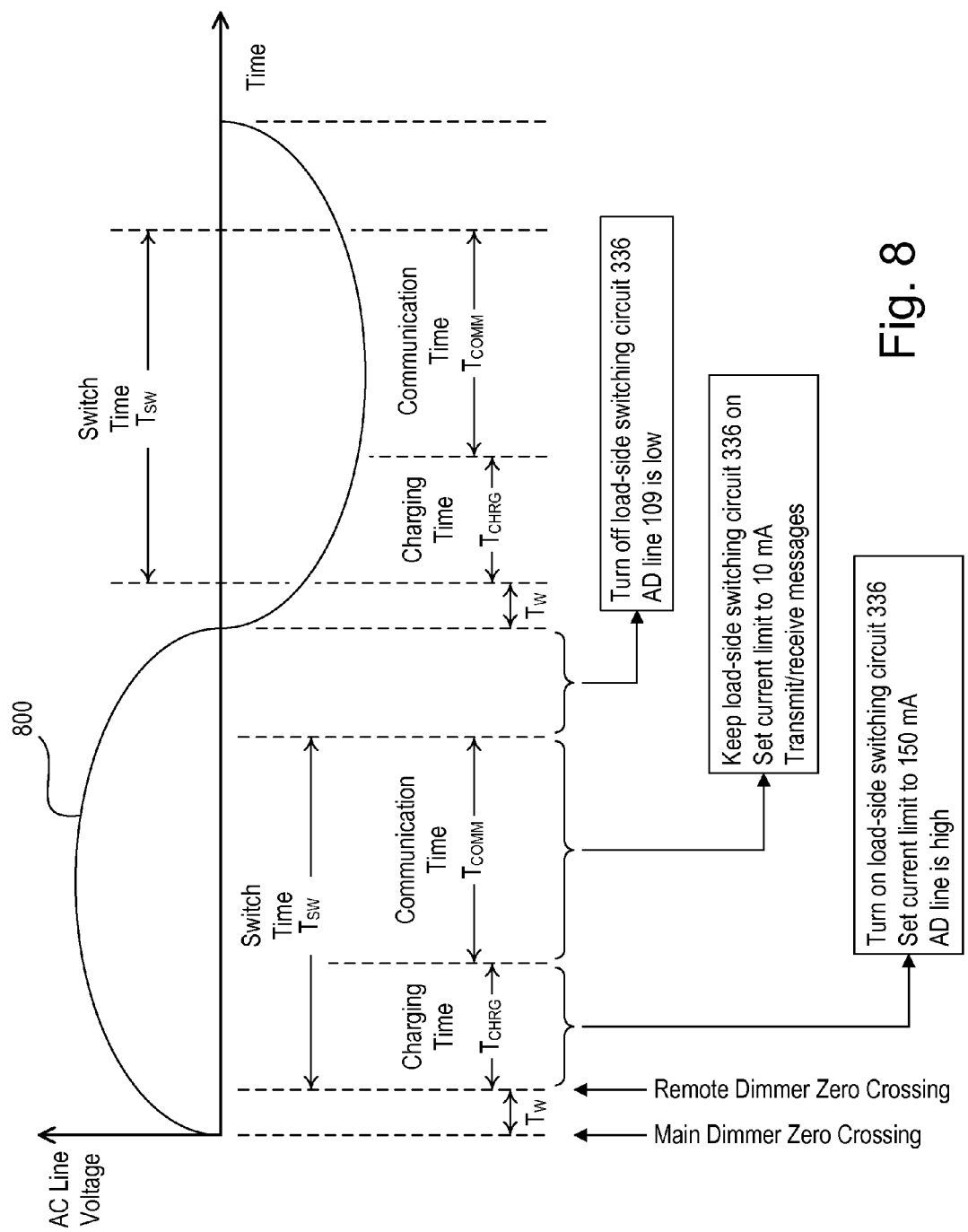
FIG. 8 is a timing diagram of a complete line cycle of an AC voltage waveform detailing the operation of the system of FIG. 1.

FIG. 8 is a simplified timing diagram of a complete line cycle of an AC voltage waveform 800 provided by the AC power source 106. The timing diagram illustrates the operation of the main dimmer 102 during each half-cycle of the AC voltage waveform 800. The main dimmer 102 is operable to allow the remote dimmers 104 to charge their internal power supplies 730 during the remote dimmer power supply charging time period $T_{CHRG}$ each half-cycle. The main dimmer 102 and the remote dimmers 104 are operable to transmit and receive digital messages on the AD line 109 during the communication time period $T_{COMM}$ each half-cycle. The controller 314 of the main dimmer 102 enables the first switching circuit 336 and the second switch circuit 338 during a switch time period $T_{SW}$, which is equal to the remote dimmer power supply charging time period $T_{CHRG}$ plus the communication time period $T_{COMM}$.

Figure 9A:
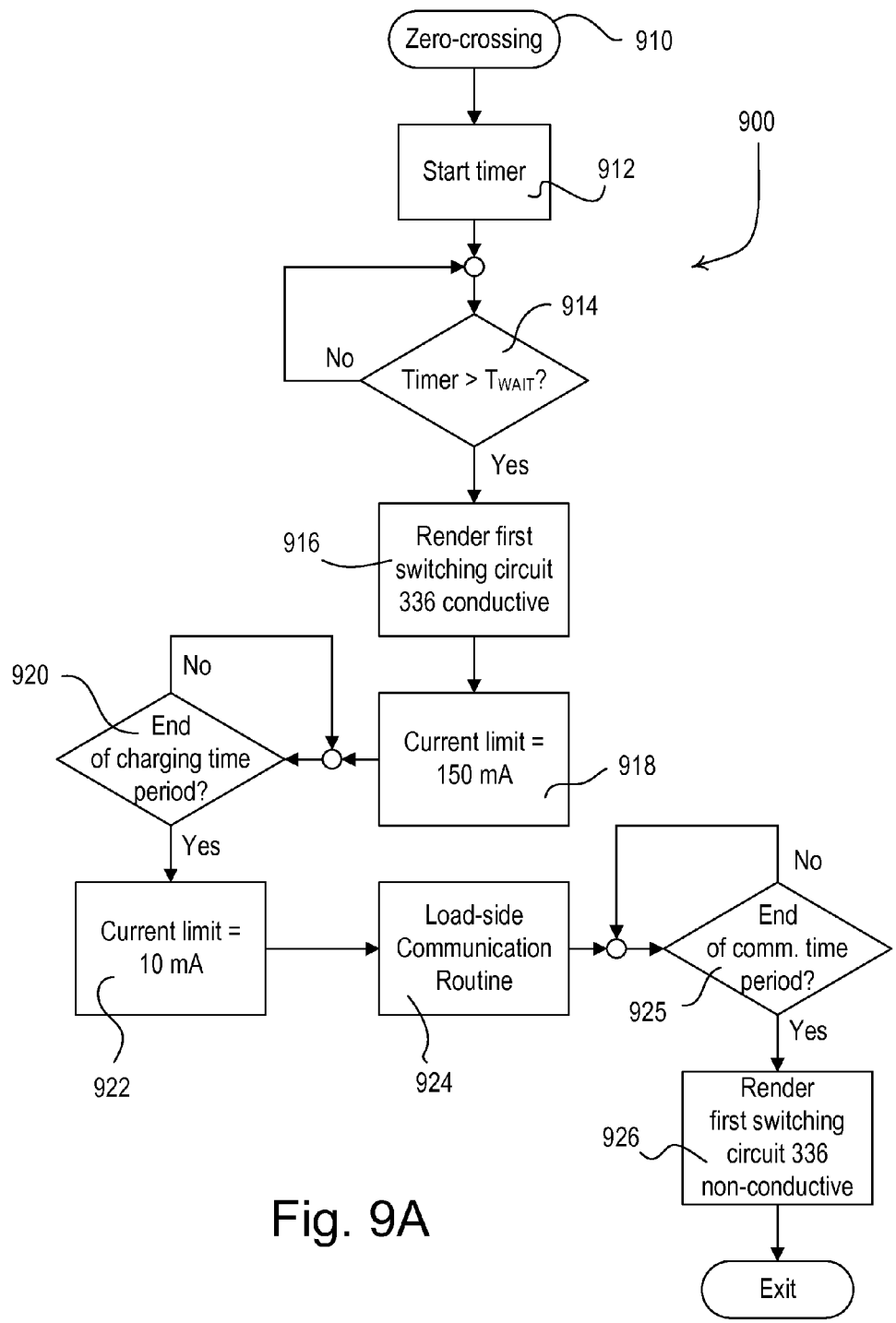
FIGS. 9A and 9B are simplified flowcharts of a load-side multi-location control procedure and a line-side multi-location control procedure, respectively, executed by a controller of the main dimmer of FIG. 3.
Figure 9B:
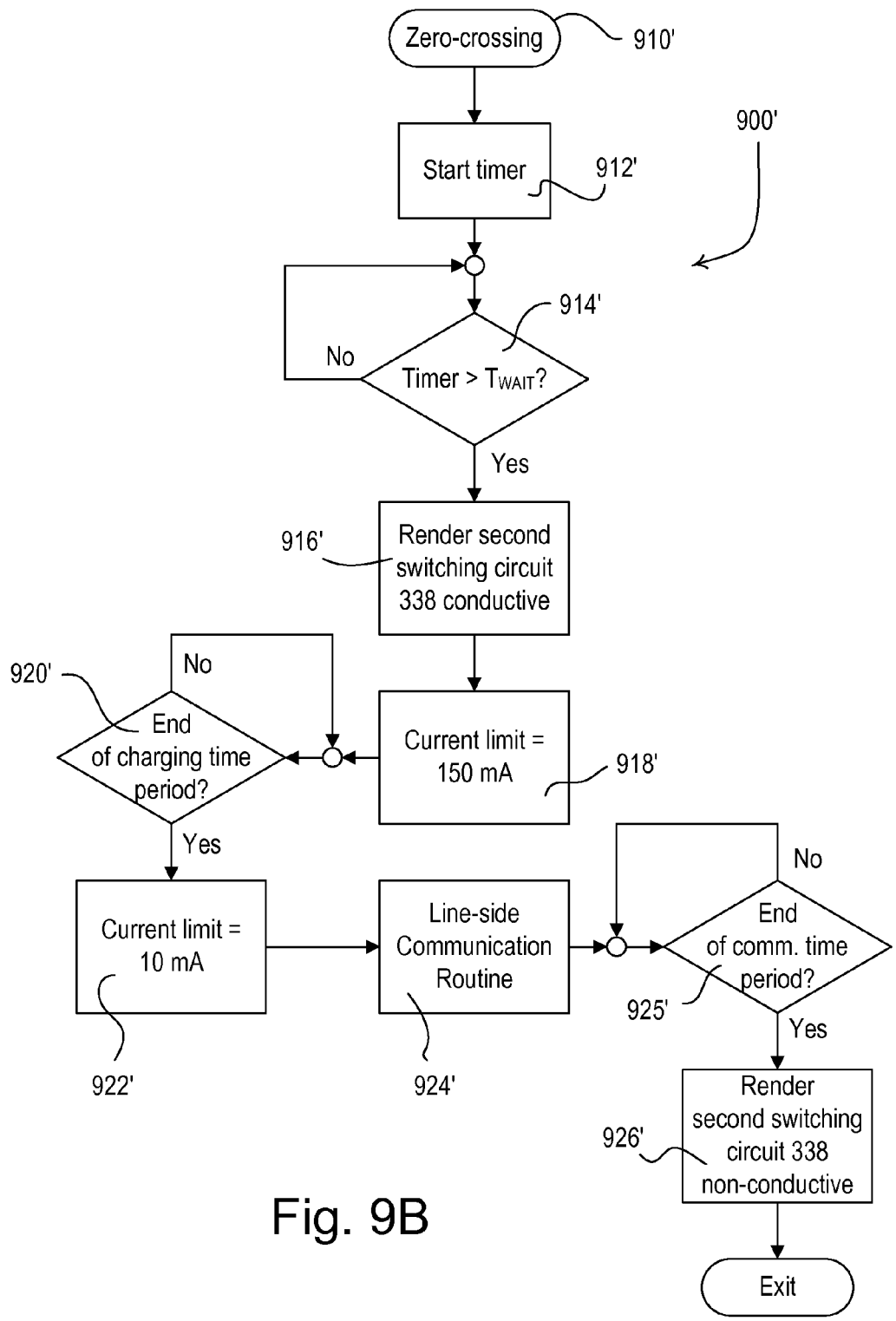

FIG. 9A is a simplified flowchart of a load-side multi-location control procedure 900 executed by the controller 314 of the main dimmer 102 the positive half-cycles of the AC power source 106. FIG. 9B is a simplified flowchart of a line-side multi-location control procedure 900' executed by the controller 314 of the main dimmer 102 the negative half-cycles of the AC power source 106. The load-side multi-location control procedure 900 begins at the beginning of each positive half-cycle when the zero-crossing detector 318 of the main dimmer 102 signals a positive-going zero-crossing to the controller 314 at step 910. At step 912, the controller 314 starts a timer, which is used to determine when the remote dimmer power supply charging time period $T_{CHRG}$ and the communication time period $T_{COMM}$ begin and end. The controller 314 then waits at step 914 for a wait time period $T_W$ (e.g., approximately 10% of a positive half-cycle or 833 µsec).

At step 916, the controller 314 renders the load-side switching circuit (i.e., the first switching circuit 336) conductive by driving the first control signal SW1_CTL low at the beginning of the remote dimmer power supply charging time period $T_{CHRG}$. The controller 314 then controls the current limit circuit 332 to have a current limit of 150 mA at step 918 by driving the control signal I_LIMIT low. Accordingly, the second DC output voltage $V_{CC2}$ (i.e., the AD supply voltage $V_{AD}$) is provided to the remote dimmers 104 on the load side of the system 100, and the power supplies 730 of the remote dimmer 104 charge during the remote dimmer power supply charging time period $T_{CHRG}$. The zero-crossing detector 716 of each of the load-side remote dimmers 104 detects a zero-crossing at the beginning of the remote dimmer power supply charging time period $T_{CHRG}$. The remote power supply charging time period $T_{CHRG}$ lasts, for example, approximately 2 msec.

After the remote dimmer power supply charging time period $T_{CHRG}$ at step 920, the controller 314 controls the current limit of the current limit circuit 332 to approximately 10 mA at step 922 at the beginning of the communication time period $T_{COMM}$. The first switching circuit 336 is maintained conductive during the communication time period $T_{COMM}$, such that the AD line 109 remains at the AD supply voltage $V_{AD}$ (i.e., 80 volts with respect to the dimmed hot terminal DH) if the main dimmer 102 and the remote dimmers 104 are not presently communicating on the AD line 109.

The main dimmer 102 and the remote dimmers 104 are operable to transmit and receive digital messages during the communication time period $T_{COMM}$. Specifically, the controller 314 executes a load-side communication routine 924, which is described in greater detail in commonly-assigned U.S. Provisional Application, filed the same day as the present application, entitled MULTIPLE LOCATION LOAD CONTROL SYSTEM, the entire disclosure of which is hereby incorporated by reference. The main dimmer 102 and the remote dimmers 104 may encode the transmitted digital messages using Manchester encoding. However, other encoding techniques that are well known to those of ordinary skill in the art could be used. With Manchester encoding, the bits of the digital messages (i.e., either a logic zero value or a logic one value) are encoded in the transitions (i.e., the edges) of the signal on the communication link. When no messages are being transmitted on the AD line 109, the AD line floats high in an idle state. To transmit a logic zero value, the transceiver 334 is operable to "short" the AD line 109 to the dimmed hot terminal DH to cause the AD line to change from the idle state (i.e., $80 V_{DC}$) to a shorted state (i.e., a "high-to-low" transition). Conversely, to transmit a logic one value, the transceiver 334 is operable to cause the AD line to transition from the shorted state to the idle state (i.e., a "low-to-high" transition). The controller 314 renders the FET Q912 conductive to short the AD line 109 to the dimmed hot terminal DH when the first switching circuit 336 is conductive during the positive half-cycles.

The communication time period $T_{COMM}$ lasts, for example, for approximately 3.75 msec. Five (5) bits of a transmitted message may be transmitted during the communication time period $T_{COMM}$ of each half-cycle. At the end of the communication time period $T_{COMM}$ at step 925, the first switching circuit 336 is rendered non-conductive at step 926, such that the power supply 330 and the transceiver 334 of the main dimmer 104 are no longer coupled between the accessory dimmer terminal AD and the dimmed hot terminal DH.

During the negative half-cycles, a similar timing cycle occurs. Referring to FIG. 9B, the line-side multi-location control procedure 900' begins at the beginning of each negative half-cycle when the zero-crossing detector 318 of the main dimmer 102 signals a negative-going zero-crossing to the controller 314 at step 910'. The controller 314 of the main dimmer 102 renders the line-side switching circuit (i.e., the second switching circuit 338) conductive at step 916', such that the second DC output voltage $V_{CC2}$ is provided to the remote dimmers 104 on the line side of the system 100. Accordingly, the remote dimmers 104 on the line side are operable to charge their power supplies 730 from the AD supply voltage $V_{AD}$ during the remote dimmer power supply charging time period $T_{CHRG}$, and to transmit and receive digital messages during the communication time period $T_{COMM}$ using a line-side communication routine 924'. The controller 314 renders the FET Q912 conductive to short the AD line 109 to the hot terminal H when the second switching circuit 338 is conductive during the negative half-cycles. At the end of the communication time period $T_{COMM}$ at step 925', the controller 314 renders the second switching circuit 338 non-conductive at step 926'.

The digital messages transmitted between the main dimmer 102 and the remote dimmers 104 comprise, for example, four fields: a 3-bit synchronization (start) symbol, a 5-bit message description, a 7-bit message data section, and a 10-bit checksum. The synchronization (start) symbol serves to synchronize the transmission across the series of line cycles required to communicate an entire packet. Typically, the message description comprises a "light level" command or a "delay off" command. The 7-bit message data section of each digital message comprises specific data in regards to the message description of the present message. For example, the message data may comprise the actual light level information if the message description is a light level command. Up to 128 different light levels may be communicated between the main dimmer 102 and the remote dimmers 104.

Since only five bits are transmitted each half-cycle, the controller 314 uses multiple buffers to hold the digital message to be transmitted and received. Specifically, the controller 314 of the main dimmer 102 uses a load-side TX buffer and a line-side TX buffer for digital message to transmit during the positive half-cycles and negative half-cycles, respectively. Further, the controller 314 of the main dimmer 102 also uses a load-side RX buffer and a line-side RX buffer for digital messages received during the positive and negative half-cycles, respectively.

Accordingly, the main dimmers 102 and the remote dimmers 104 are operable to transmit light level information to each other in response to actuations of the touch sensitive actuator 150. The main dimmers 102 and remote dimmer 104 are then all operable to illuminate the LEDs behind the actuation member 212 to the same level to indicate the intensity of the lighting load 108.

When the system 100 is wired with the main dimmer 104 in a location other than the line side or the load side of the system, the digital message transmitted across the AD line 109 cannot pass from load side of the system to the line side of the system (and vice versa) due to the bidirectional semiconductor switch 310. Accordingly, if a user touches the actuator 210 of a remote dimmer 104 on the load side of the main dimmer 102, a remote dimmer 104 on the line side would not receive the message. To provide full system capability, the main dimmer 102 has an additional responsibility of relaying messages from one side of the system to the other. In the immediately following half-cycle, the main dimmer 102 broadcasts to the opposite side of the system 100 any communication signals that are received in the previous half-cycle. The operation of the multiple location dimming system 100 is described in greater detail in commonly-assigned, co-pending U.S. patent application Ser. No. 12/106,614, filed Apr. 23, 2008, entitled MULTIPLE LOCATION LOAD CONTROL SYSTEM, the entire disclosure of which is hereby incorporated by reference.

Figure 10A:
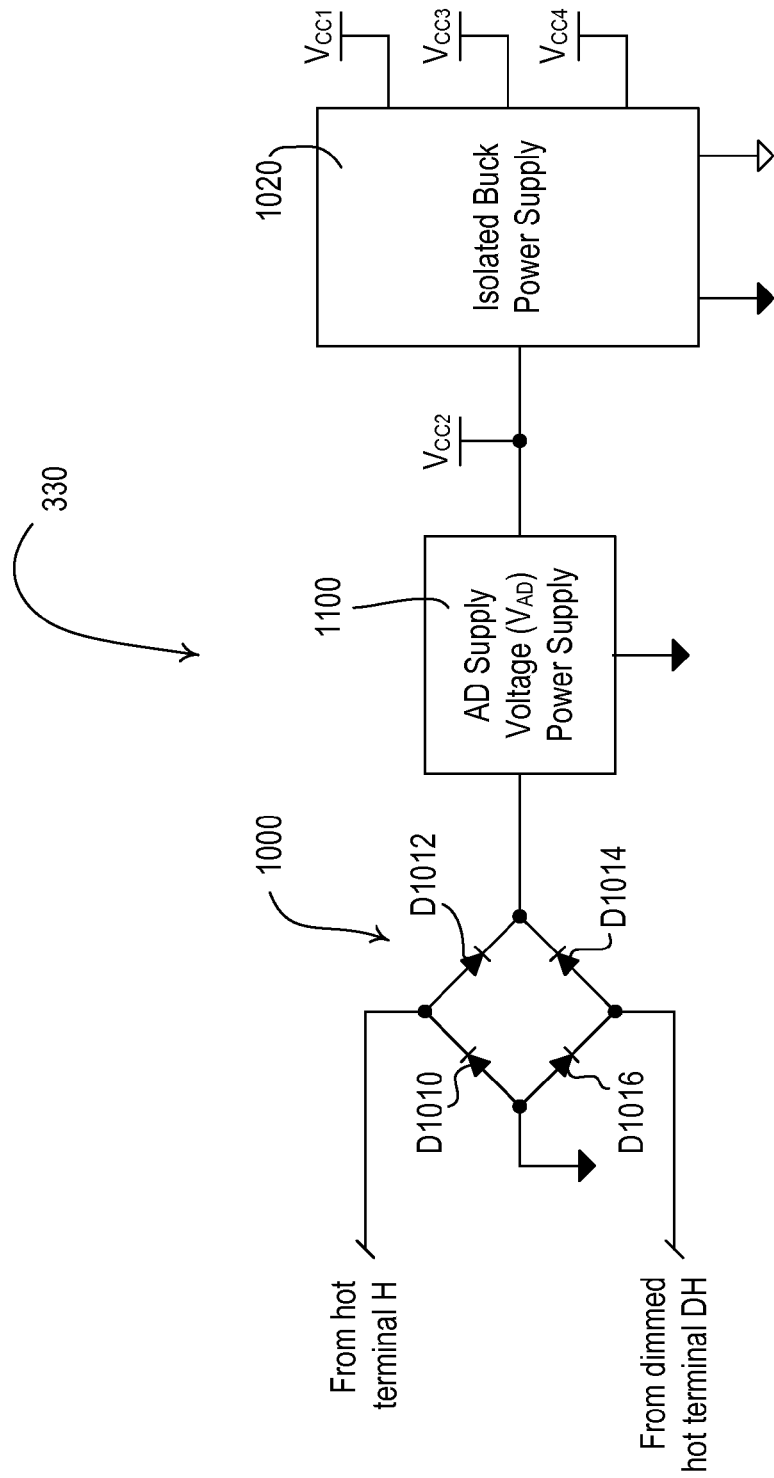
FIG. 10A is a simplified block diagram of a power supply of the main dimmer of FIG. 3.

FIG. 10A is a simplified block diagram of the power supply 330. The power supply 330 comprises a full-wave rectifier bridge 1000 having four diodes D1010, D1012, D1014, D1016. For example, the diodes D1014, D1016 may comprise the body diodes of the FETs Q610, Q630 of the first and second switching circuits 336, 338. The full-wave rectifier 1000 has AC input terminals coupled to the hot terminal H and the dimmed hot terminal DH, and DC output terminals coupled across a first stage of the power supply 330, e.g., an AD supply voltage ($V_{AD}$) power supply 1100, which generates the second non-isolated DC output voltage $V_{CC2}$ at an output. The power supply 330 further comprises an isolated buck converter power supply 1020, which receives the second non-isolated DC output voltage $V_{CC2}$, and generates the first isolated DC output voltage $V_{CC1}$, the third non-isolated DC output voltage $V_{CC3}$, and the fourth non-isolated DC output voltage $V_{CC4}$.

Figure 10B:
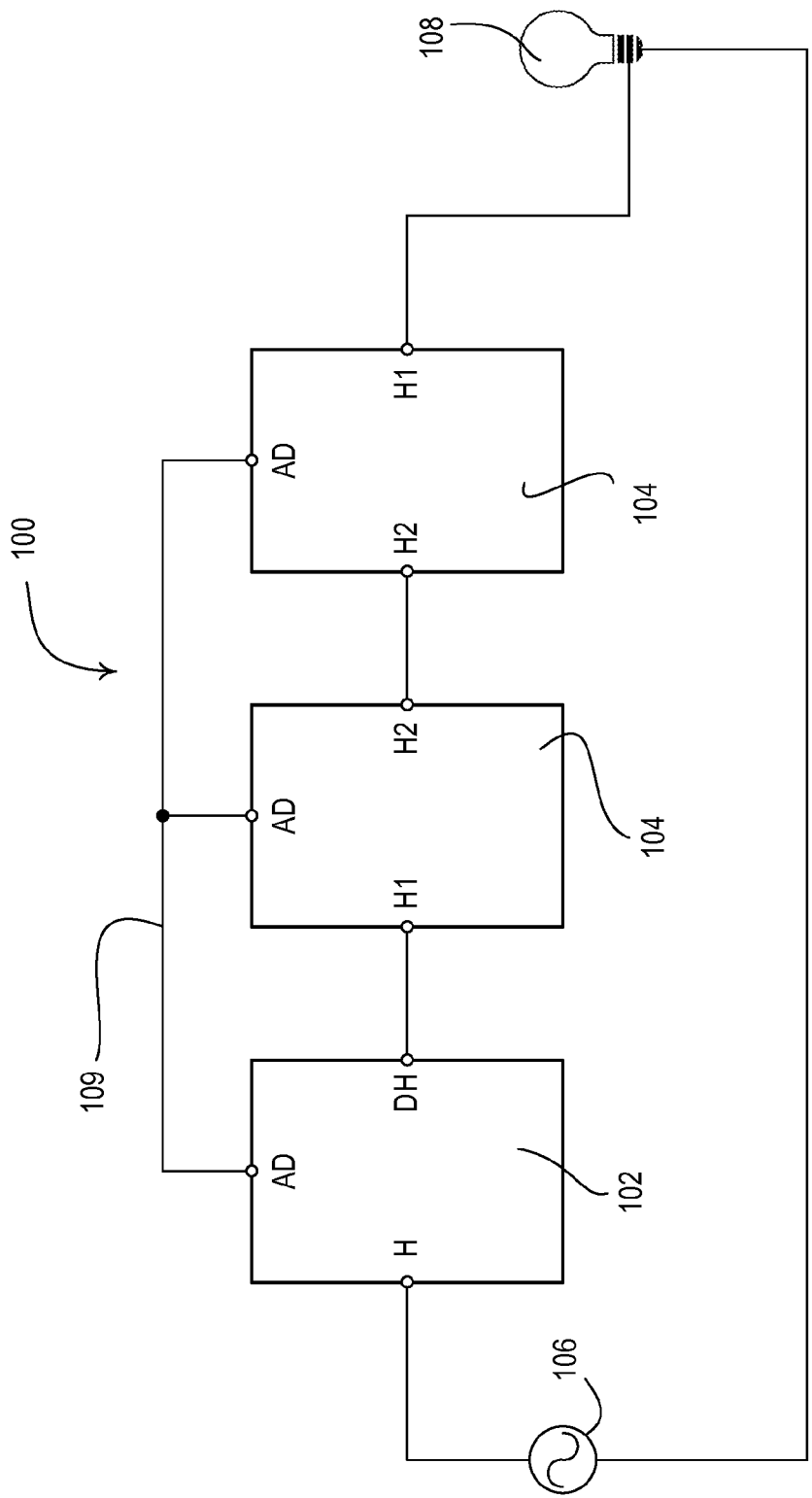
FIG. 10B is a simplified block diagram of a multiple location dimming system having two remote dimmers coupled to the line side of a main dimmer.

As previously discussed, the second non-isolated DC output voltage $V_{CC2}$ is provided on the AD line 109 as the AD supply voltage $V_{AD}$ for supplying power to the remote dimmers 104. If a plurality of remote dimmers 104 are located on either the load-side of the multiple location dimming system 100 (as shown in FIG. 10B) or the line-side of the system 100, the current drawn from the AD supply voltage power supply 1100 (i.e., an output current $I_{OUT}$ of the power supply) may be asymmetrical (i.e., a greater amount of current is drawn during one half-cycle than the subsequent half-cycle for a plurality of consecutive line-cycles). The power supply 1100 is operable to draw a substantially symmetrical input current $I_N$ from the AC power source (i.e., the amount of current drawn in each half-cycle is approximately the same) even though the output current $I_{OUT}$ may be asymmetrical.

Figure 11:
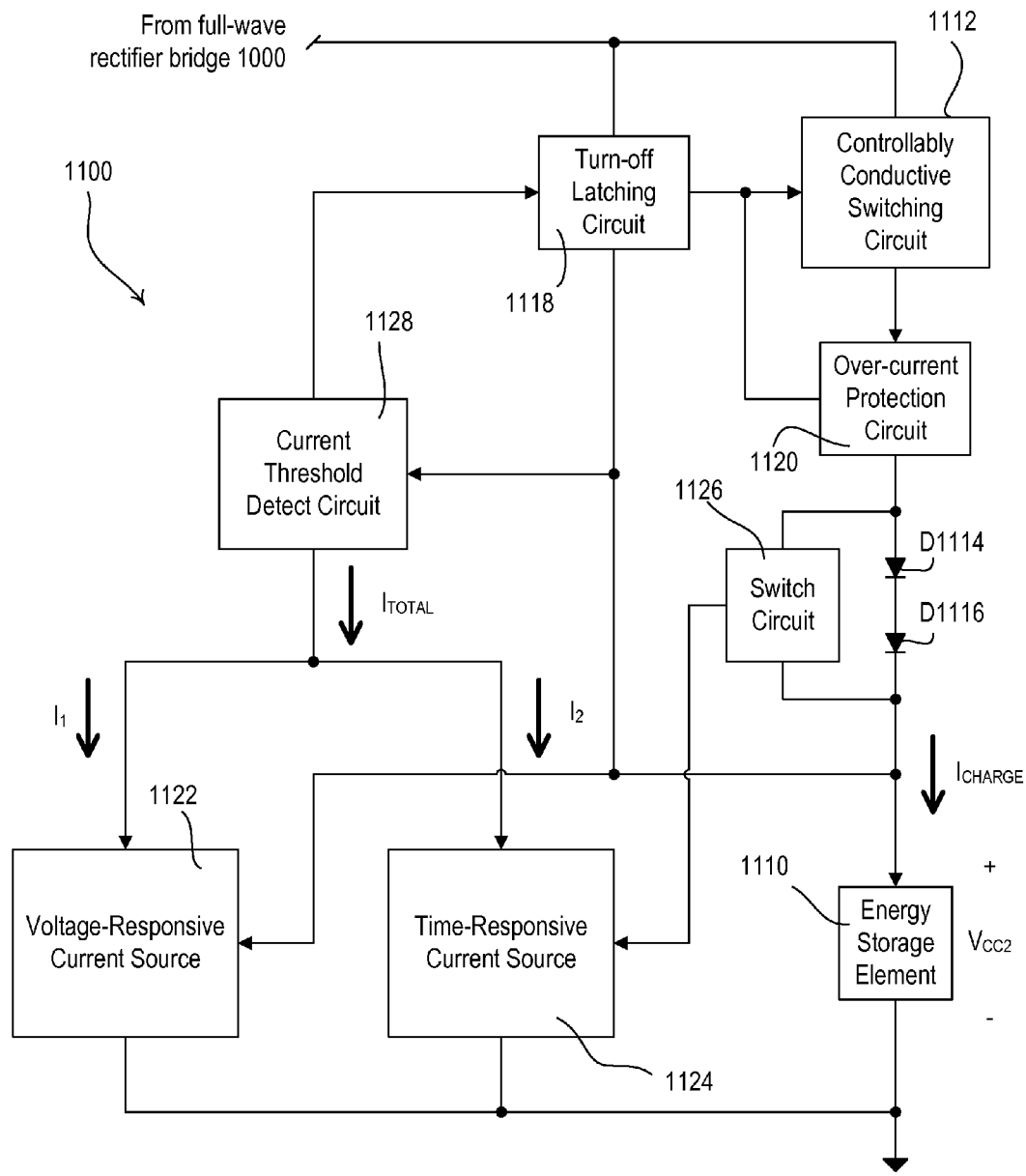
FIG. 11 is a simplified block diagram of an AD supply voltage power supply of the power supply of FIG. 10A.
Figure 12:
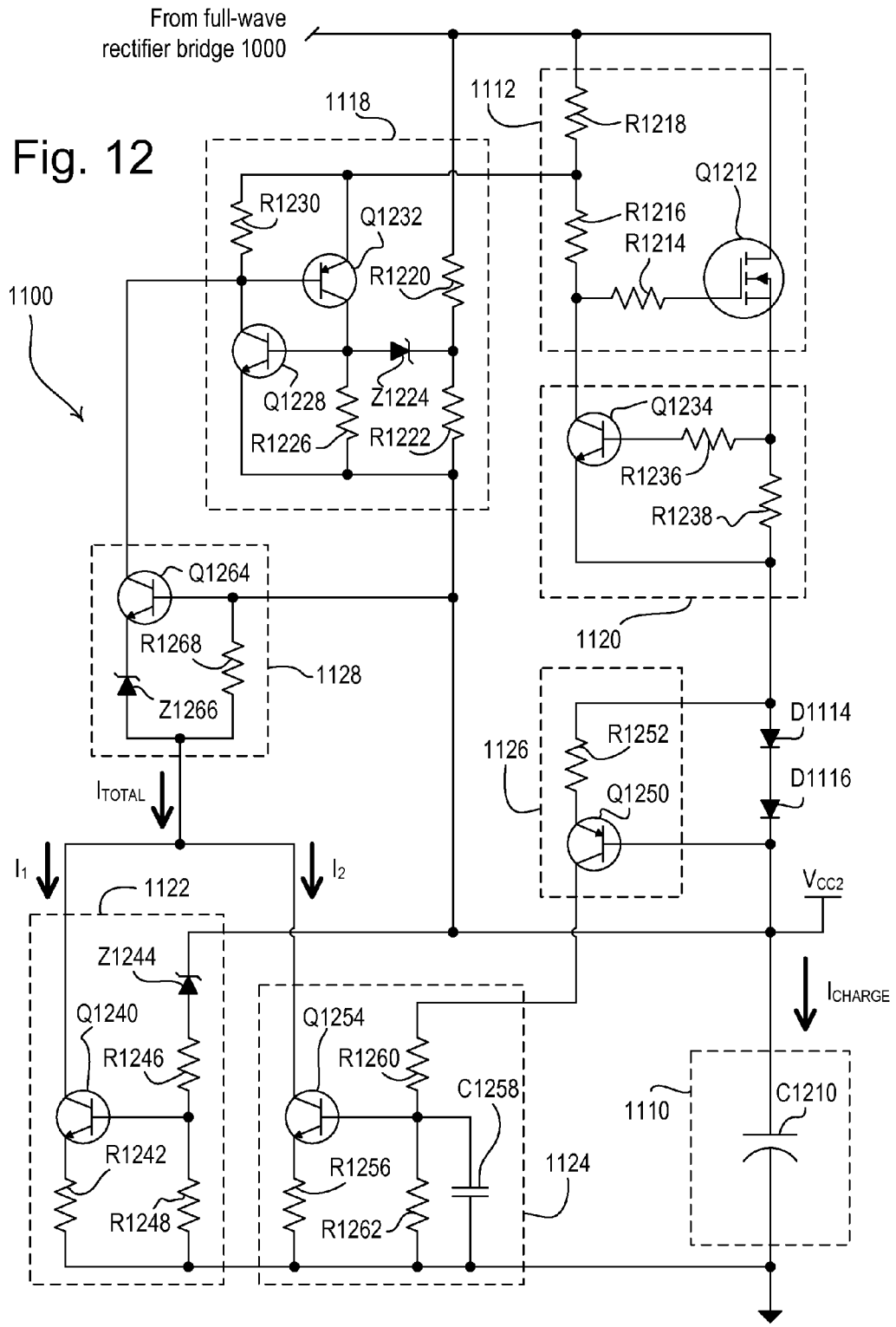
FIG. 12 is a simplified schematic diagram of the AD supply voltage power supply of FIG. 11.

FIG. 11 is a simplified block diagram of the AD supply voltage power supply 1100 of the power supply 330 of the main dimmer 100. The output voltage $V_{CC2}$ is generated across an energy storage element 1110, e.g., an energy storage capacitor C1210 (FIG. 12). The power supply 1100 comprises a controllably conductive switching circuit 1112 for conducting a charging current $I_{CHARGE}$ through two diodes D1114, D1116, and the energy storage element 1110 at the beginning of each half-cycle of the AC power source. The energy storage element 1110 charges for a main dimmer power supply charging time period $T_{PS}$ each half-cycle. When the voltage across the main dimmer 102 and thus across the power supply 1100 exceeds a predetermined voltage (e.g., 120 volts), a turn-off latch circuit 1118 causes the controllably conductive switching circuit 1112 to become non-conductive for the remainder of the present half-cycle. An overcurrent protection circuit 1120 protects the controllably conductive switching circuit 1112 in the event of an overcurrent condition through the controllably conductive switching circuit. The output voltage $V_{CC2}$ has a small amount of ripple, such that the output voltage typically ranges from approximately 78-80 V, but may possibly drop down to approximately 70 V.

The power supply 1100 is also operable to control the controllably conductive switching circuit 1112 to charge the energy storage element 1110 in response to both the magnitude of the output voltage $V_{CC2}$ and the amount of time that the power supply has been charging the energy storage element during the present half-cycle. Specifically, the power supply 1100 attempts to keep the main dimmer power supply charging time period $T_{PS}$ substantially constant from one half-cycle to the next without dependence upon the instantaneous magnitude of the output voltage $V_{CC2}$. In order to achieve this level of control, the power supply 1100 comprises a first voltage-responsive current source 1122 and a second time-responsive current source 1124. The first voltage-responsive current source 1122 conducts a first current $I_1$ having a magnitude dependent upon the magnitude of the output voltage $V_{CC2}$ (i.e., the voltage-responsive current source generates a first control signal representative of the magnitude of the of the output voltage $V_{CC2}$). The second time-responsive current source 1124 conducts a second current $I_2$ having a magnitude dependent upon the amount of time that the energy storage element 1110 has been charging during the present half-cycle (i.e., the time-responsive current source generates a second control signal representative of the amount of time that the energy storage element has been charging during the present half-cycle). Specifically, the time-responsive current source 1122 begins to conduct the second current $I_2$ in response to a switch circuit 1126 becoming conductive when the diodes D1114, D1116 begin to conduct at the beginning of each half-cycle.

The first and second currents $I_1$ and $I_2$ are conducted through a current threshold detect circuit 1128, which determines when the total current $I_{TOTAL}$ (i.e., the sum of the first and second currents) exceeds a predetermined current threshold $I_{TH}$. When the total current $I_{TOTAL}$ exceeds the current threshold $I_{TH}$, the current threshold detect circuit 1128 triggers the turn-off latching circuit 1118 causing the controllably conductive switching circuit 1112 and the switch circuit 1126 to both become non-conductive for the remainder of the present half-cycle. Accordingly, the energy storage element 1110 stops charging after the controllably conductive switching circuit 1112 becomes non-conductive. The first voltage-responsive current source 1122 and the second time-responsive current source 1124 work together to maintain the main dimmer power supply charging time period $T_{PS}$ substantially constant from one half-cycle to the next.

FIG. 12 is a simplified schematic diagram of the power supply 1100 of the power supply 330 of the main dimmer 100. As previously mentioned, the energy storage element 1110 comprises a capacitor, i.e., the energy storage capacitor C1210 (e.g., having a capacitance of 27 µF). The controllably conductive switching circuit 1112 comprises a semiconductor switch, e.g., a FET Q1212 (such as part number STN1NK60Z manufactured by ST Microelectronics), which is coupled in series with the capacitor C1210 for control of the charging current $I_{CHARGE}$ through the capacitor. The gate of the FET Q1212 is coupled to the positive DC output terminal of the rectifier bridge 1000 through resistors R1214, R1216, R1218 (e.g., having resistances of 10Ω, 15 kΩ, and 162 kΩ, respectively). As the voltage at the positive DC output terminal of the rectifier bridge 1000 increases at the beginning of the each half-cycle, the FET Q1212 becomes conductive when the appropriate voltage (e.g., approximately 15 volts) is provided at the gate of the FET Q1212, which typically occurs approximately 1 msec after each zero-crossing of the AC voltage waveform 800.

The turn-off latching circuit 1118 comprises two resistors R1220, R1222, which are coupled in series between positive DC output terminal of the rectifier bridge 1000 and the output voltage $V_{CC2}$ and have, for example, resistances of 470 kΩ and 22 kΩ, respectively. When the voltage at the junction of the resistors R1220, R1222 exceeds the breakover voltage of a zener diode Z1224, a voltage generated across a resistor R1226 causes an NPN bipolar junction transistor Q1228 to be rendered conductive. The transistor Q1228 is coupled to the gate of the FET Q1212 through a resistor R1230, such that the FET is rendered non-conductive when the transistor Q1228 becomes conductive. A voltage produced across the resistor R1230 when the transistor Q1228 is conductive causes a second NPN bipolar junction transistor Q1232 to become conductive, thus, latching the FET Q1212 non-conductive until the end of the present half-cycle.

The overcurrent protection circuit 1120 comprises an NPN bipolar junction transistor Q1234, a base resistor R1236, and a sense resistor R1238. The sense resistor R1238 is coupled in series with the capacitor C1210 and in parallel with the series combination of the base resistor R1236 and the base-emitter junction of the transistor Q1234. When the magnitude of the charging current exceeds a predetermined threshold, the voltage across the sense resistor R1238 has an appropriate magnitude such that the transistor Q1234 becomes conductive. Accordingly, the gate of the FET Q1212 is pulled down and the FET Q1212 is rendered non-conductive. The base resistor R1236 and the sense resistor R1238 have, for example, resistances of 1 kΩ and 1 Ω, respectively such that the transistor Q1234 is rendered conductive when the charging current $I_{CHARGE}$ exceeds approximately 700 mA.

The voltage-responsive current source 1122 comprises an NPN bipolar junction transistor Q1240 operable to conduct the first current $I_1$ in response to the magnitude of the output voltage $V_{CC2}$. The emitter of the transistor Q1240 is coupled to the non-isolated circuit common through a resistor R1242 (e.g., having a resistance of 100 kΩ). The voltage-responsive current source 1122 further comprises a zener diode Z1244 (e.g., having a breakover voltage of approximately 48 V) and two resistors R1246, R1248 (e.g., having resistances of 215 kΩ, and 100 kΩ, respectively). The series combination of the zener diode Z1244 and the resistors R1246, R1248 is coupled across the energy storage capacitor C1210 (i.e., across the output voltage $V_{CC2}$). When the output voltage $V_{CC2}$ exceeds the breakover voltage of the zener diode Z1244, the zener diode conducts a current having a magnitude dependent upon the instantaneous magnitude of the output voltage $V_{CC2}$ through the resistors R1246, R1248. The base of the transistor Q1240 is coupled to the junction of the two resistors R1246, R1248, such that the magnitude of the current through the resistor R1242 and thus the first current $I_1$ through the transistor Q1240 are dependent upon the instantaneous magnitude of the output voltage $V_{CC2}$. For example, the first current $I_1$ has a magnitude of approximately 63 µA when the output voltage $V_{CC2}$ has a magnitude of 70 V and of approximately 93 uA when the output voltage $V_{CC2}$ has a magnitude of 80 V, i.e., the magnitude of the first current $I_1$ varies in magnitude by approximately 3 µA per one volt change in the output voltage.

When the diodes D1114, D1116 are conductive, the switch circuit 1126 is rendered conductive and the time-responsive current source 1124 conducts the second current $I_2$. The switch circuit 1126 comprises a PNP bipolar junction transistor Q1250 and a resistor R1252 (e.g., having a resistance of 1 kΩ). The transistor Q1250 and the resistor R1252 are coupled such that the series combination of the resistor R1252 and the emitter-base junction of the transistor Q1250 are coupled in parallel with the two series-connected diodes D1114, D1116. When the diodes D1114, D1116 are conducting the charging current $I_{CHARGE}$, the transistor Q1250 is conductive, such that the output voltage $V_{CC2}$ is provided across the time-responsive current source 1124.

An NPN bipolar junction transistor Q1254 of the time-responsive current source 1124 is operable to conduct the second current $I_2$ through an emitter resistor R1256 (e.g., having a resistance of 470 kΩ). The second current $I_2$ increases in magnitude (from approximately zero amps) with respect to time when the switch circuit 1126 is conductive. When the capacitor C1210 begins to charge at the beginning of each half-cycle (such that the switch circuit 1126 is rendered conductive), the output voltage $V_{CC2}$ is provided across a timing circuit comprising a capacitor C1258 (e.g., having a capacitance of 0.01 µF) and two resistors R1260, R1262 (e.g., having resistances of 200 kΩ and 56 kΩ, respectively). The base of the transistor Q1254 is coupled to the junction of the capacitor C1258 and the two resistors R1260, R1262, such that the voltage at the base of the transistor and the second current $I_2$ through the transistor increase in magnitude with respect to time after the switch circuit 1126 is rendered conductive. For example, the magnitude of the second current $I_2$ is substantially linear with respect to time during the time period that the capacitor C1210 is charging each half-cycle (i.e., proportional to the amount of time that the capacitor C1210 has been charging during the present half-cycle. The magnitude of the second current $I_2$ may range, for example, from approximately 0 amps to 30 µA.

After the latch circuit 1118 controls the controllably conductive switching circuit 1112 to be non-conductive (causing the switch circuit 1126 to become non-conductive), the capacitor C1258 of the time-responsive current source 1124 discharges through the resistor R1262. The voltage across the capacitor C1258 is reset to approximately zero volts by the end of each half-cycle, such that the magnitude of the second current $I_2$ is approximately zero amps at the beginning of the next half-cycle.

The current threshold detect circuit 1128 conducts the total current $I_{TOTAL}$ of the first and second currents $I_1$, $I_2$ and triggers the turn-off latching circuit 1118 when the total current exceeds the predetermined current threshold $I_{TH}$, e.g., approximately 100-110 µA. The current threshold detect circuit 1128 comprises an NPN bipolar junction transistor Q1264, a zener diode Z1266 (e.g., having a breakover voltage of approximately 5.1 V), and a resistor R1268 (e.g., having a resistance 100 kΩ). The resistor R1268 is coupled across the series combination of the base-emitter junction of the transistor Q1264 and the zener diode Z1266, such that the transistor Q1264 is rendered conductive when the current through the resistor R1268 is approximately 50-55 µA. The transistor Q1264 is coupled to the turn-off latching circuit 1118, such that when the transistor Q1264 conducts a current of approximately 50-55 µA through the resistor R1230, the transistor Q1232 becomes conductive, thus rendering the FET Q1212 non-conductive.

Figure 13:
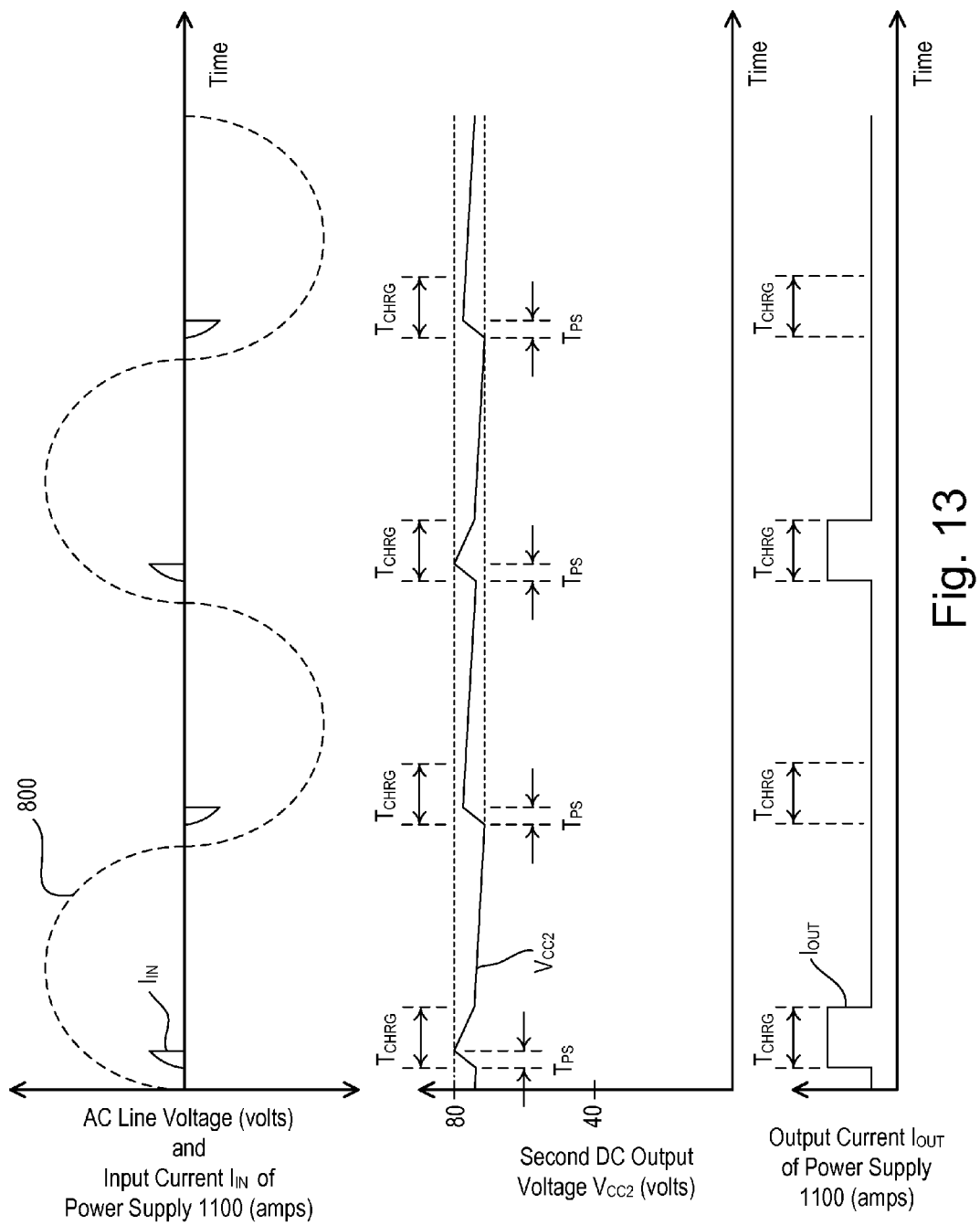
FIG. 13 is a diagram showing example waveforms that illustrate the operation of the power supply of FIG. 11.

FIG. 13 is a diagram showing example waveforms that illustrate the operation of the power supply 1100 when the remote dimmers 504 are located on the load-side of the system 500 as shown in FIG. 10B. As shown in FIG. 13, the power supply 1100 maintains the main dimmer power supply charging time period $T_{PS}$ substantially constant from one half-cycle to the next and the input current $I_{IN}$ of the power supply 1100 is substantially symmetrical. The main dimmer power supply charging time period $T_{PS}$ has a length of approximately 1 msec+/−0.2 msec (i.e., only changes by 20% or less from one half-cycle to the next), such that the output current $I_{OUT}$ has a DC component less than approximately 0.3 V, and, for example, between 0.2 V and 0.3 V. The main dimmer power supply charging time period $T_{PS}$ begins at approximately the same time as the remote dimmer power supply charging time period $T_{CHRG}$ for the internal power supplies 730 of the remote dimmers 104.

Since the remote devices 104 are coupled to the load-side of the main dimmer 102, the output current $I_{OUT}$ of the power supply 1100 is increased in magnitude during the remote dimmer power supply charging time periods $T_{CHRG}$ of only the positive half-cycles of the AC voltage waveform 800, i.e., the output current is asymmetrical. More current is drawn from the power supply 1100 during the positive half-cycles and the output voltage $V_{CC2}$ decreases in magnitude by a greater amount during the positive half-cycles. Because the main dimmer power supply charging time period $T_{PS}$ is maintained substantially constant from one half-cycle to the next, but the output current $I_{OUT}$ is asymmetrical, the output voltage $V_{CC2}$ has a greater peak value during the positive half-cycles than the negative half-cycles. However, the average value of the output voltage $V_{CC2}$ is maintained substantially constant from one line-cycle to the next.

Although the present invention has been described in relation to particular embodiments thereof, many other variations and modifications and other uses will become apparent to those skilled in the art. Therefore, the present invention should not be limited by the specific disclosure herein.

The values provided herein for the values and part numbers of the components of FIGS. 4, 5, 6, and 12 are provided as examples in regards to the preferred embodiment of the present invention and should not limit the scope of the present invention. For example, it would be well within the capabilities of one having ordinary skill in the art to modify the values of the components of FIGS. 4, 5, 6 and 12 and still obtain the load control device of the present invention.

What is claimed is:

1. A power supply for use in a load control device for controlling the amount of power delivered to an electrical load from an AC power source, the load control device operable to receive an AC voltage waveform of the AC power source, the power supply operable to generate a DC output voltage for powering a remote control device, the power supply comprising:
an energy storage element across which the output voltage is generated, the energy storage element arranged to conduct an asymmetrical output current through the remote control device;
a controllably conductive switching circuit coupled in series electrical connection with the energy storage element, the controllably conductive switching circuit configured to conduct a charging current from the AC power source through the energy storage element for charging the energy storage element to produce the output voltage, the controllably conductive switching circuit configured to switch to a conductive state after the magnitude of the AC voltage waveform exceeds approximately the magnitude of the DC voltage during a half-cycle of the AC voltage waveform;
a threshold detect circuit configured to receive a first control signal representative of the magnitude of the output voltage and a second control signal representative of the amount of time that the energy storage element has been charging during the half-cycle; and
a latching circuit coupled to the controllably conductive switching circuit and the threshold detect circuit, the latching circuit configured to cause the controllably conductive switching circuit to become non-conductive in response to the magnitude of the output voltage and the amount of time that the energy storage element has been charging during the half-cycle, resulting in the magnitude of the charging current conducted from the AC power source through the energy storage element being approximately the same each half-cycle.

2. The power supply of claim 1, wherein the energy storage device charges for the length of a charging time period during the half-cycle, and the threshold detect circuit operates to maintain the length of the charging time period substantially the same from one half-cycle to the next in response to the first and second control signals.

3. The power supply of claim 2, wherein the first control signal comprises a first current having a magnitude representative of the magnitude of the output voltage, and the second control signal comprises a second current having a magnitude representative of the amount of time that the energy storage element has been charging during the half-cycle.

4. The power supply of claim 3, wherein the threshold detect circuit sums the first and second currents to produce a total current.

5. The power supply of claim 4, wherein the latching circuit is responsive to the threshold detect circuit to cause the controllably conductive switching circuit to become non-conductive when the total current exceeds a predetermined current threshold.

6. The power supply of claim 3, further comprising:
a first voltage-responsive current source configured to generate the first current in response to the output voltage; and
a second time-responsive current source configured to generate the second current in response to the amount of time that the energy storage element has been charging during the half-cycle.

7. The power supply of claim 2, wherein the length of the charging time period changes by approximately 20% or less from one half-cycle to the next.

8. The power supply of claim 2, wherein the length of the charging time period is approximately 1 msec +/−0.2 msec.

9. The power supply of claim 1, wherein the controllably conductive switching circuit comprises a semiconductor switch.

10. The power supply of claim 1, wherein the energy storage element comprises a capacitor.

11. A load control device for controlling the power delivered to an electrical load from an AC power source in response to a remote control device, the load control device and the remote control device adapted to be coupled in series electrical connection between the source and the load, such that the load control device and the remote control device may both conduct a load current from the AC power source to the electrical load without a neutral connection to the neutral side of the AC power source, the remote control device adapted to be further coupled to the load control device through an accessory wiring, the load control device comprising:
a bidirectional semiconductor switch adapted to be coupled in series between the source and the load for controlling the power delivered to the load;
a controller coupled to a control input of the bidirectional semiconductor switch for controlling the power delivered to the load; and
a power supply for generating a link voltage for powering the remote control device via the accessory wiring, the power supply conducting an asymmetrical output current and drawing a substantially symmetrical input current from the AC power source.

12. The load control device of claim 11, wherein the power supply draws current from the AC power source for the length of a power supply charging time during each half-cycle of the AC power source, and the length of the power supply charging time is substantially the same from one half-cycle to the next.

13. The load control device of claim 12, wherein the length of the power supply charging time changes by approximately 20% or less from one half-cycle to the next.

14. The load control device of claim 12, wherein the length of the power supply charging time is approximately 1 msec +/−0.2 msec.

15. The load control device of claim 12, wherein the input current of the power supply of the load control device has a DC component of less than approximately 0.3 V.

16. The load control device of claim 12, wherein the remote control device draws current from the power supply of the load control device during every other half-cycle of the AC power source.

17. The load control device of claim 11, wherein the power supply comprises an energy storage capacitor that stops charging each half-cycle of the AC power source in response to both the magnitude of the link voltage and the amount of time that the capacitor has been charging during the half-cycle.

18. The load control device of claim 17, wherein the power supply further comprises a controllably conductive switching circuit coupled in series electrical connection with the capacitor for selectively charging the capacitor to produce the link voltage, such that the power supply draws the input current from the AC power source.

19. The load control device of claim 18, the power supply further comprises a latching circuit coupled to the controllably conductive switching circuit;
wherein the controllably conductive switching circuit switches to a conductive state after the magnitude of the AC voltage waveform exceeds approximately the magnitude of the link voltage, and the latching circuit causing the controllably conductive switching circuit to become non-conductive, such that the capacitor stops charging after the capacitor has been charging for a switching time.

20. The load control device of claim 19, wherein the latching circuit causes the controllably conductive switching circuit to become non-conductive in response to the magnitude of the link voltage and the amount of time that the capacitor has been charging during the half-cycle.

* * * * *